(12) United States Patent
Nakayama

(10) Patent No.: US 12,490,359 B2
(45) Date of Patent: Dec. 2, 2025

(54) LIGHT-EMITTING ELEMENT DRIVING DEVICE, LIGHTING DEVICE, AND VEHICLE

(71) Applicant: ROHM CO., LTD., Kyoto (JP)

(72) Inventor: Masaaki Nakayama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 142 days.

(21) Appl. No.: 18/471,049

(22) Filed: Sep. 20, 2023

(65) Prior Publication Data

US 2024/0015866 A1    Jan. 11, 2024

Related U.S. Application Data

(63) Continuation of application No. PCT/JP2022/012646, filed on Mar. 18, 2022.

(30) Foreign Application Priority Data

Mar. 26, 2021  (JP) .................................. 2021-052846
Mar. 26, 2021  (JP) .................................. 2021-052974

(51) Int. Cl.
*H05B 45/30*        (2020.01)
*H05B 45/18*        (2020.01)
(Continued)

(52) U.S. Cl.
CPC ........... *H05B 45/345* (2020.01); *H05B 45/18* (2020.01); *H05B 45/325* (2020.01); *H05B 45/50* (2020.01); *B60Q 1/1415* (2013.01)

(58) Field of Classification Search
CPC ........ H05B 45/10; H05B 45/14; H05B 45/18; H05B 45/20; H05B 45/24; H05B 45/28;
(Continued)

(56) References Cited

U.S. PATENT DOCUMENTS

2023/0090191 A1*  3/2023  Suyama ................. H05B 45/38
                                                    315/307
2023/0422372 A1* 12/2023  Takahashi .............. H05B 45/10

FOREIGN PATENT DOCUMENTS

JP        2012071712     4/2012
WO    WO 2019187279    10/2019

OTHER PUBLICATIONS

International Search Report and Written Opinion in International Appln. No. PCT/JP2022/012646, mailed on May 24, 2022, 13 pages (with machine translation).

* cited by examiner

*Primary Examiner* — Long Nguyen
(74) *Attorney, Agent, or Firm* — Fish & Richardson P.C.

(57) ABSTRACT

A light-emitting element driving device (5) includes: a first external terminal (SET terminal) connectable to a first setting resistor (Rset); a second external terminal (SET_TH terminal) connectable to a first thermistor (TH1) with a negative coefficient arranged beside a light-emitting element light source (10); a current setter (2) that generates a setting current (Iset) based on the resistance value of the first setting resistor; a current adder (3) that generates an addition current (Iadd) with a negative coefficient to the resistance value of the first thermistor; and a current driver (1) that generates an output current (Iout) that passes through the light-emitting element light source connected between an application terminal for a supply voltage (Vin) and a ground terminal based on a reference current (Iref) which is the sum of the setting current and the addition current.

14 Claims, 21 Drawing Sheets

(51) Int. Cl.
*H05B 45/325* (2020.01)
*H05B 45/345* (2020.01)
*H05B 45/50* (2022.01)
*B60Q 1/14* (2006.01)

(58) Field of Classification Search
CPC ...... H05B 45/30; H05B 45/32; H05B 45/325; H05B 45/327; H05B 45/34; H05B 45/345; H05B 45/50; H05B 45/52; H05B 45/54; B60Q 1/1415; H10H 20/80
See application file for complete search history.

LIGHT-EMITTING ELEMENT DRIVING DEVICE, LIGHTING DEVICE, AND VEHICLE

CROSS-REFERENCE TO RELATED APPLICATIONS

This nonprovisional application is a continuation application of International Patent Application No. PCT/JP2022/012646 filed on Mar. 18, 2022, which claims priority Japanese Patent Application No. 2021-052846 filed on Mar. 26, 2021 and Japanese Patent Application No. 2021-052974 filed on Mar. 26, 2021, the entire contents of which are hereby incorporated by reference.

TECHNICAL FIELD

The present disclosure relates to light-emitting element driving devices.

BACKGROUND ART

Various light-emitting element driving devices are known for applications to drive light-emitting elements such as LEDs (light-emitting diodes).

One example of known light-emitting element driving devices is disclosed in Patent Document 1 identified below. The light-emitting element driving device of Patent Document 1 has a current setter. According to a reference current generated by the current setter, an output current to be supplied to an LED is generated. The current setter is connected to a setting resistor and a negative-coefficient thermistor that are externally connected to the light-emitting element driving device. The current setting resistor and the negative-coefficient thermistor are connected in parallel. The current setter yields current setting characteristics with a positive coefficient (such that, as the resistance value of the current setting resistor increases, the reference current increases). This permits the reference current to be decreased as the ambient temperature of the thermistor rises, and thus allows temperature-based derating of the output current.

Another example of known light-emitting element driving devices is disclosed in Patent Document 2 identified below. The light-emitting element driving device of Patent Document 2 has a current driver that generates an output current to be passed through a light-emitting element light source connected between an application terminal for a supply voltage and a ground terminal and a bypass function block that, when the supply voltage drops, bypasses at least one of a plurality of light-emitting elements constituting the light-emitting element light source to reduce the number of series-connected light-emitting elements through which the output current passes. This permits the light-emitting element light source to remain lit in the event of a drop in the supply voltage.

CITATION LIST

Patent Literature

Patent Document 1: JP-A-2012-071712
Patent Document 2: WO 2019/187279

DESCRIPTION OF EMBODIMENTS

Technical Scheme I

Technical Scheme I will be described below.

1. LED Lighting Device

Figure 1:
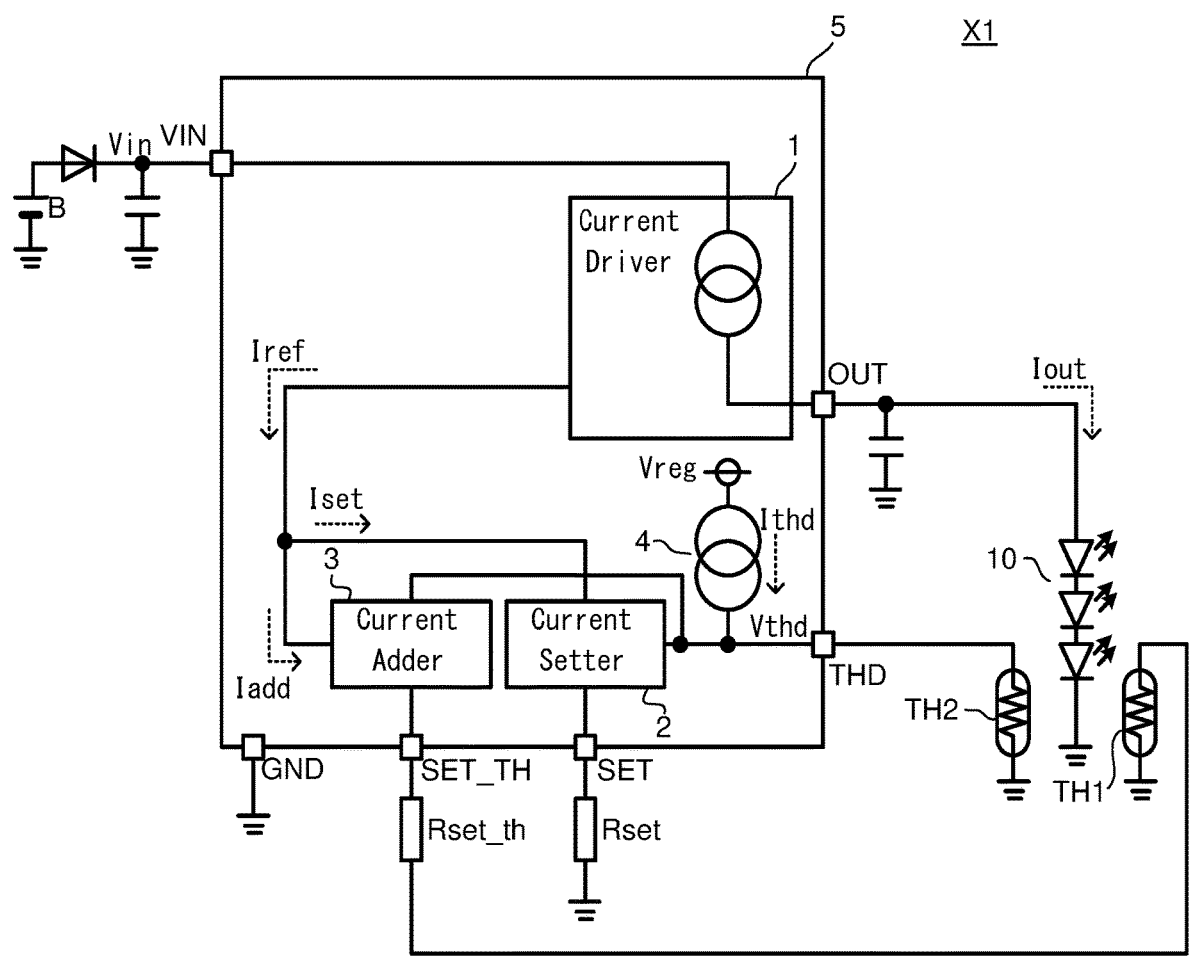
FIG. 1 is a diagram showing the overall configuration of an LED lighting device according to an illustrative embodiment.

FIG. 1 is a diagram showing the overall configuration of an LED lighting device X1 according to an illustrative embodiment. The LED lighting device X1 is a vehicle-mounted light that is lit by being supplied with a supply voltage Vin from a battery B. The LED lighting device X1 can be, for example, a headlight, daylight running light, taillight, stoplight, or turning light. The battery is the power source of the vehicle that incorporates the LED lighting device X1, and is implemented suitably with a lead storage battery, lithium-ion battery, or the like.

As shown in FIG. 1, the LED lighting device X1 includes an LED driving device 5 and an LED light source 10, and also includes, as various discrete components externally connected to the LED driving device 5, setting resistors Rset and Rset_th and thermistors TH1 and TH2.

The LED driving device 5 is a semiconductor integrated circuit device (what is called an LED driver IC) that operates by being supplied with the supply voltage Vin from the battery B to generate an output current Iout to be supplied to the LED light source 10.

The LED driving device 5 has, as external terminals for electrical connection with the outside, a VIN terminal, an OUT terminal, a THD terminal, a SET terminal, a SET_TH terminal, and a GND terminal. The VIN terminal is connected to an application terminal for the supply voltage Vin. That is, the LED driving device 5 is supplied with the supply voltage Vin via the VIN terminal.

The LED light source 10 is an LED string configured with a plurality of LED chips (light-emitting elements) connected in series. The LED light source 10 may be configured with a single LED, or with LED chips connected both in series and in parallel.

The LED driving device 5 has, integrated in it as its internal blocks, a current driver 1, a current setter 2, a current adder 3, and a constant current source 4.

Note that FIG. 1 shows not all of the internal blocks of the LED driving device 5; the LED driving device 5 has, in addition to the blocks shown in FIG. 1, a control logic, a dimmer for PWM (pulse-width modulation) dimming of the LED light source 10, various fault detectors, a fault indicator for giving out fault indications, an internal power supply circuit for generating an internal voltage, a UVLO (under-voltage lock-out) circuit, etc.

The current driver 1 is provided between the VIN terminal and the OUT terminal. The anode of the LED light source 10 is connected to the OUT terminal. The cathode of the LED light source 10 is connected to a ground terminal. The current driver 1 generates the output current Iout that passes through the LED light source 10 connected between the application terminal for the supply voltage Vin and the ground terminal.

The current driver 1 performs constant current control on the output current Iout such that the output current Iout remains equal to a predetermined target value. Though not shown in FIG. 1, the current driver 1 can be configured to include, for example, an output transistor that is provided in the current path of the output current Iout, a sense resistor that converts the output current Iout into a feedback voltage, and an error amplifier that performs linear driving on the output transistor such that the feedback voltage remains equal to a reference voltage. The target value of the output current Iout can be set as desired according to a reference current Iref, which will be described later.

The current setter 2 generates a setting current Iset. The setting current Iset is used to generate a reference current Iref That is, the current setter 2 generates a setting current Iset for setting the target value of the output current Iout. The setting current Iset can be adjusted by adjusting the resistance value of the setting resistor Rset externally connected to the SET terminal.

Between an application terminal for an internal voltage Vreg and the THD terminal is provided the constant current source 4. To the THD terminal, the thermistor TH2 is externally connected. The thermistor TH2 is a thermistor with a negative coefficient. A thermistor with a negative coefficient has characteristics such that its resistance value decreases as temperature increases. The thermistor TH2 is arranged beside the LED light source 10. The constant current source 4 passes a constant current Ithd through the thermistor TH2 via the THD terminal, so that a terminal voltage Vthd appears at the THD terminal. Based on the terminal voltage Vthd, the current setter 2 adjusts the setting current Iset. In this way, temperature-based derating is performed on the output current Iout to adjust it according to the ambient temperature of the LED light source 10.

The current adder 3 generates an addition current Iadd. The reference current Iref is generated by adding up (as the sum of) the setting current Iset and the addition current Iadd. Outside the LED driving device 5, between the SET_TH terminal and the ground terminal, the setting resistor Rset_th and the thermistor TH1 are connected in series. The thermistor TH1 is a thermistor with a negative coefficient, and is arranged beside the LED light source 10. The current adder 3 adjusts the addition current Iadd based on the resistance values of the setting resistor Rset_th and the thermistor TH1 (i.e., the combined resistance value of the setting resistor Rset_th and the thermistor TH1) and the terminal voltage Vthd. Thus, the current adder 3, by adjusting the output current Iout according to the ambient temperature of the LED light source 10, performs brightness control and temperature-based derating for the LED light source 10.

2. Adjustment of the Output Current

Figure 2:
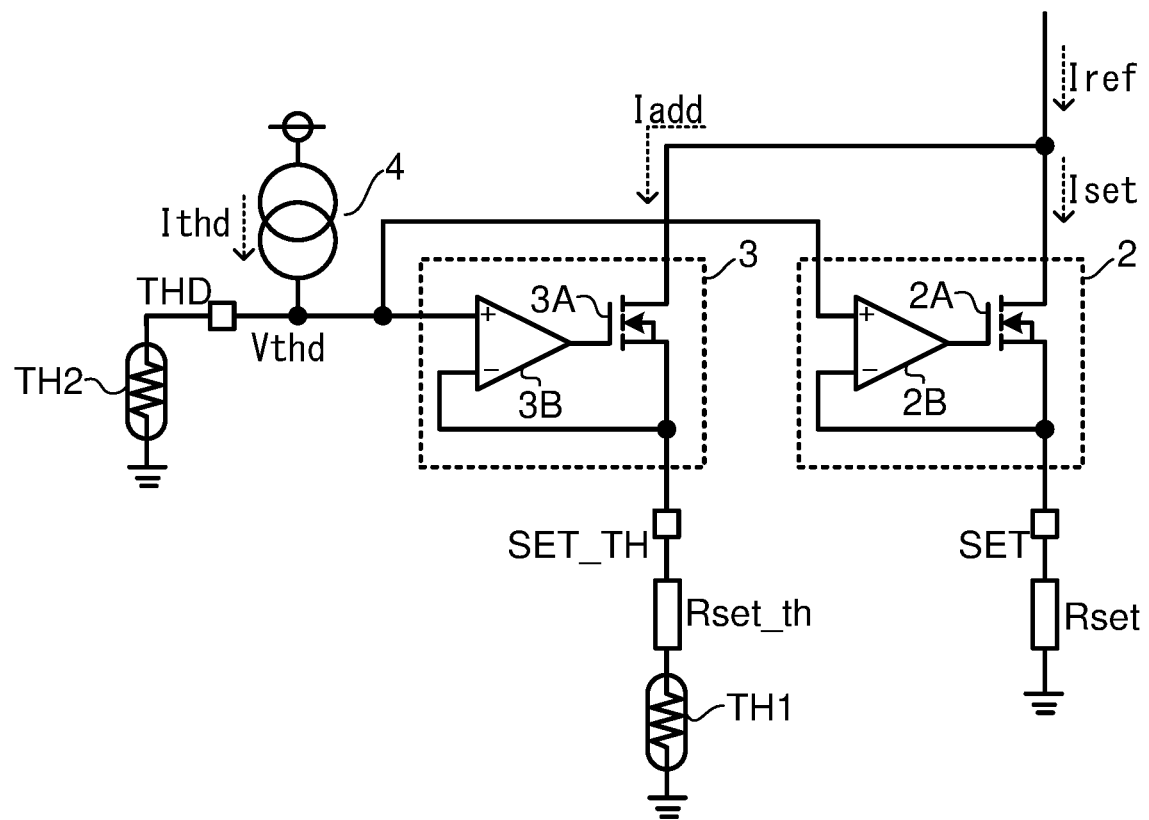
FIG. 2 is a diagram showing a specific example of the internal configuration of a current setter and a current adder.

FIG. 2 is a diagram showing a specific example of the internal configuration of the current setter 2 and the current adder 3.

The current setter 2 includes an output transistor 2A and an error amplifier 2B. The output transistor 2A is arranged in the path of the setting current Iset, and is configured with an NMOS transistor (N-channel MOSFET). The source of the output transistor 2A is connected to the SET terminal. The node at which the output transistor 2A and the SET terminal are connected together is connected to the inverting input terminal (−) of the error amplifier 2B. The non-inverting input terminal (+) of the error amplifier 2B is connected to the THD terminal. The output terminal of the error amplifier 2B is connected to the gate of the output transistor 2A.

The current adder 3 includes an output transistor 3A and an error amplifier 3B. The output transistor 3A is arranged in the path of the addition current Iadd, and is configured with an NMOS transistor. The drain of the output transistor 3A is connected to the drain of the output transistor 2A. The source of the output transistor 3A is connected to the SET_TH terminal. The node at which the output transistor 3A and the SET_TH terminal are connected together is connected to the inverting input terminal (−) of the error amplifier 3B. The non-inverting input terminal (+) of the error amplifier 3B is connected to the THD terminal. The output terminal of the error amplifier 3B is connected to the gate of the output transistor 3A.

The current setter 2 configured as described above controls the voltage at the SET terminal so as to keep it equal to the terminal voltage Vthd; thus the setting current Iset is given by the following formula:

$$Iset=Vthd/Rset$$

where Vthd=TH2×Ithd (TH2 is the resistance value of the thermistor TH2.)

Thus, the setting current Iset has a negative coefficient to the setting resistor Rset (such that, as the resistance value of the setting resistor Rset is increased, the setting current Iset decreases) and has a positive coefficient to the thermistor TH2 (terminal voltage Vthd) (such that, as the resistance value of the thermistor TH2 is increased, hence as the terminal voltage Vthd is increased, the setting current Iset increases).

The current adder 3 configured as described above controls the voltage at the SET_TH terminal so as to keep it equal to the terminal voltage Vthd; thus the addition current Iadd is given by the following formula:

$$Iadd=Vthd/(Rset\_th+TH1)(TH1 \text{ is the resistance value of the thermistor } TH1.)$$

Thus, the addition current Iadd has a negative coefficient to the resistance value of the thermistor TH1 (such that, as the resistance value of the thermistor TH1 is increased, the addition current Iadd decreases) and has a positive coefficient to the thermistor TH2 (terminal voltage Vthd) (such that, as the resistance value of the thermistor TH2 is increased, hence as the terminal voltage Vthd is increased, the addition current Iadd increases).

On the other hand, the reference current Iref is given by $$Iref=Iset+Iadd$$

The target value of the output current Iout is set to be higher as the reference current Iref is higher (so as to has a positive coefficient to the reference current Iref).

Thus, as the ambient temperature of the LED light source 10 rises and the resistance value of the thermistor TH1 decreases, the addition current Iadd increases. Incidentally, as the ambient temperature of the LED light source 10 rises and the resistance value of the thermistor TH2 decreases, the addition current Iadd decreases, but the rate of this decrease is surpassed by the rate of increase of the addition current Iadd ascribable to the thermistor TH1; consequently, as temperature rises, the addition current Iadd increases.

Figure 3:
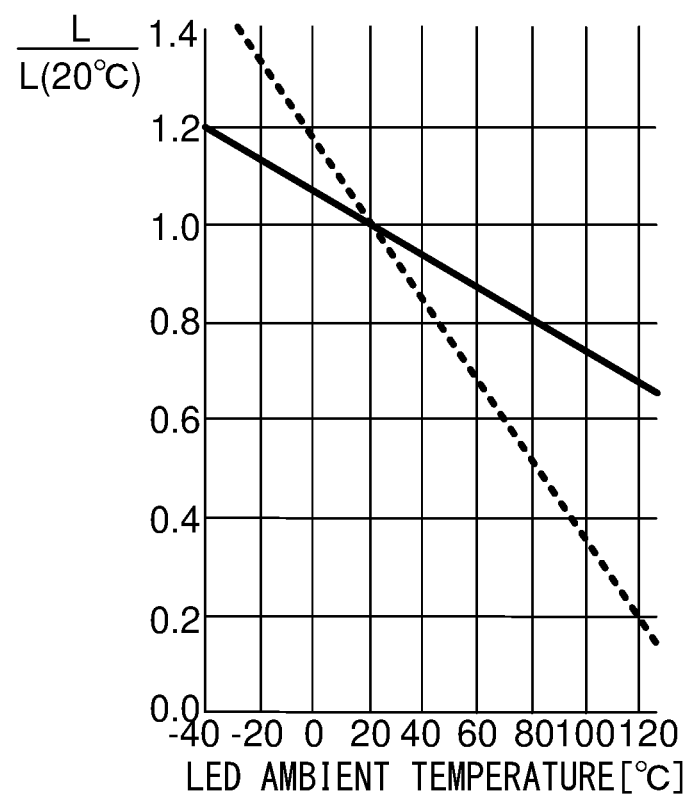
FIG. 3 is a graph showing, for red LEDs, one example of the relationship between LED ambient temperature and brightness.

FIG. 3 shows, for red LEDs, one example of the relationship between the LED ambient temperature (horizontal axis) and the brightness (vertical axis) (assuming that the LED current has a predetermined constant value). Here, the brightness along the vertical axis is expressed as the ratio to the brightness at 20° C. Different LEDs used exhibit different characteristics, and so FIG. 3 shows two examples of characteristics, one with a solid line and the other with a broken line. As shown there, LEDs have characteristics such that their brightness reduces significantly as temperature rises. This can be coped with by, as described above, increasing the addition current Iadd as the ambient temperature of the LED light source 10 rises, because this results in increasing the reference current Iref, hence the output current Iout, thereby suppressing a drop in brightness.

Figure 4:
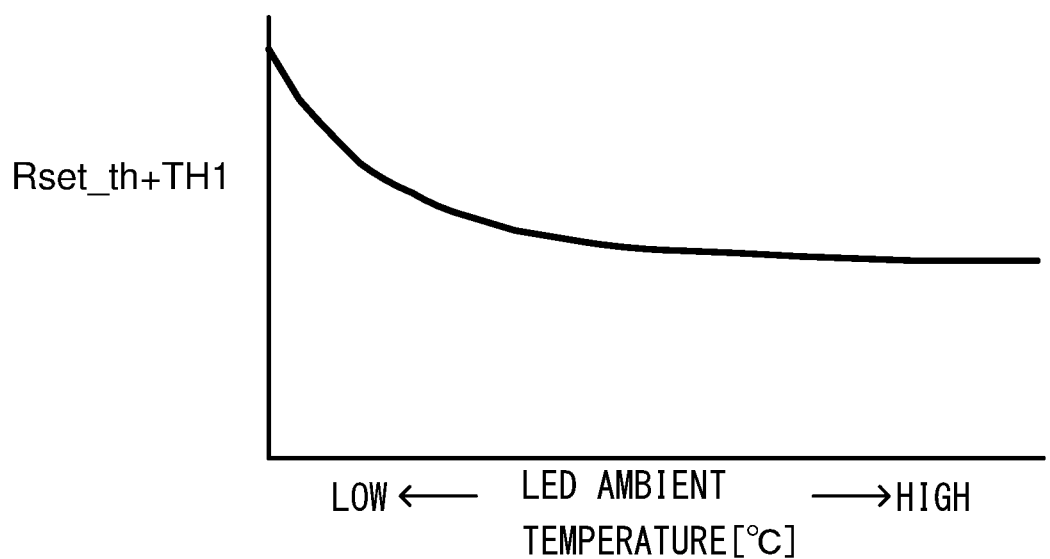
FIG. 4 is a graph showing one example of the relationship between the ambient temperature of an LED light source and the combined resistance value of a setting resistor Rset_th and a thermistor TH1.

FIG. 4 shows one example of the relationship between the ambient temperature of the LED light source 10 (LED ambient temperature) and the combined resistance value of the setting resistor Rset_th and the thermistor TH1. As shown there, as temperature rises, the combined resistance value decreases; even so, using not only the thermistor TH1 but also the setting resistor Rset_th, which is a fixed resistor, in series helps reduce the variation of the combined resistance value in a high-temperature range. It is thus possible to prevent an excessive addition current Iadd in a high-temperature range.

Figure 5:
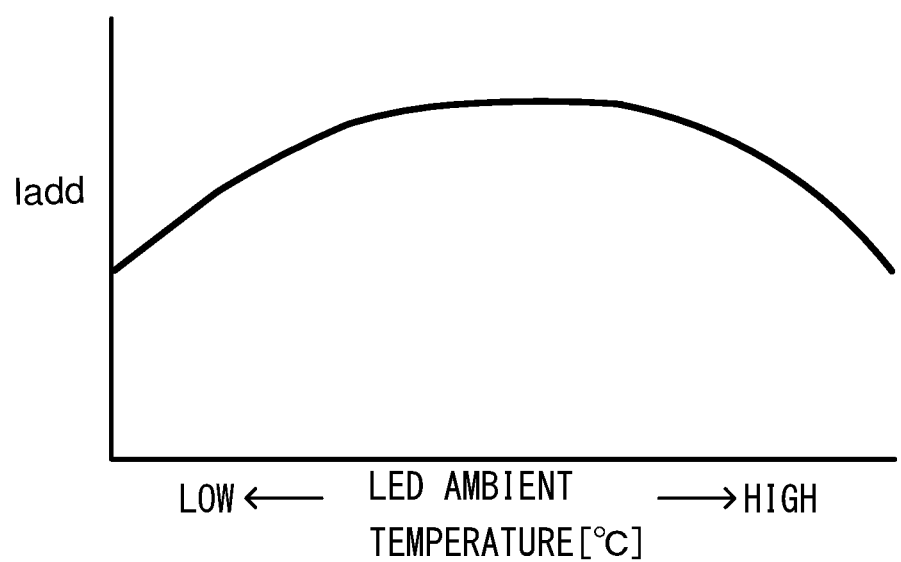
FIG. 5 is a graph showing, in a form corresponding to FIG. 4, one example of the relationship between the ambient temperature of an LED light source and an addition current Iadd.

FIG. 5 shows, in a form corresponding to FIG. 4, one example of the relationship between the LED ambient temperature and the addition current Iadd. As shown there, in a low-temperature range, as temperature rises, the addition current Iadd increases; however, in a high-temperature range, due to suppressed variation of the above-mentioned combined resistance value as shown in FIG. 4, the thermistor TH2 (terminal voltage Vthd) exerts a greater effect such that, as temperature rises, the addition current Iadd reduces. This allows, in a high-temperature range, the reference current Iref, hence the output current Iout, to decrease as temperature rises, thereby reducing heat generation in the LED light source 10. It is thus possible to prolong the lifetime of the LED light source 10.

Figure 6:
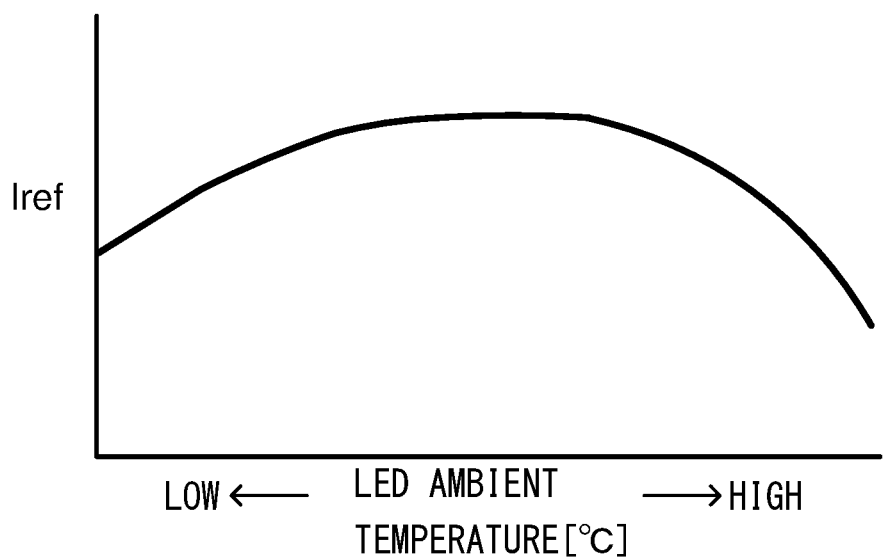
FIG. 6 is a graph showing, in a form corresponding to FIGS. 4 and 5, one example of the relationship between the ambient temperature of an LED light source and a reference current Iref.

FIG. 6 shows, in a form corresponding to FIGS. 4 and 5, one example of the relationship between the LED ambient temperature and the reference current Iref. As the LED ambient temperature increases, the resistance value of the thermistor TH2 decreases and the setting current Iset decreases. The rate at which the addition current Iadd increases as the LED temperature rises is higher than the rate at which the setting current Iset decreases; consequently, the reference current Iref increases. However, in a range where the LED ambient temperature is high, as temperature rises, the addition current Iadd decreases as shown in FIG. 5; thus, as the setting current Iset too decreases, the reference current Iref decreases greatly. This makes it possible, in a range where the LED ambient temperature is high, to reduce the output current Iout and suppress heat generation in the LED light source 10.

The non-inverting input terminal (+) of the error amplifier 3B in the current adder 3 does not necessarily be connected to the THD terminal; it may instead be connected to an application terminal for an interval voltage with a fixed value. In that case, in a range where the LED ambient temperature is high, the addition current Iadd does not decrease; even so, the setting resistor Rset_th can be used to suppress an increase in the addition current Iadd.

3. Socket-Type LED Module

Figure 7:
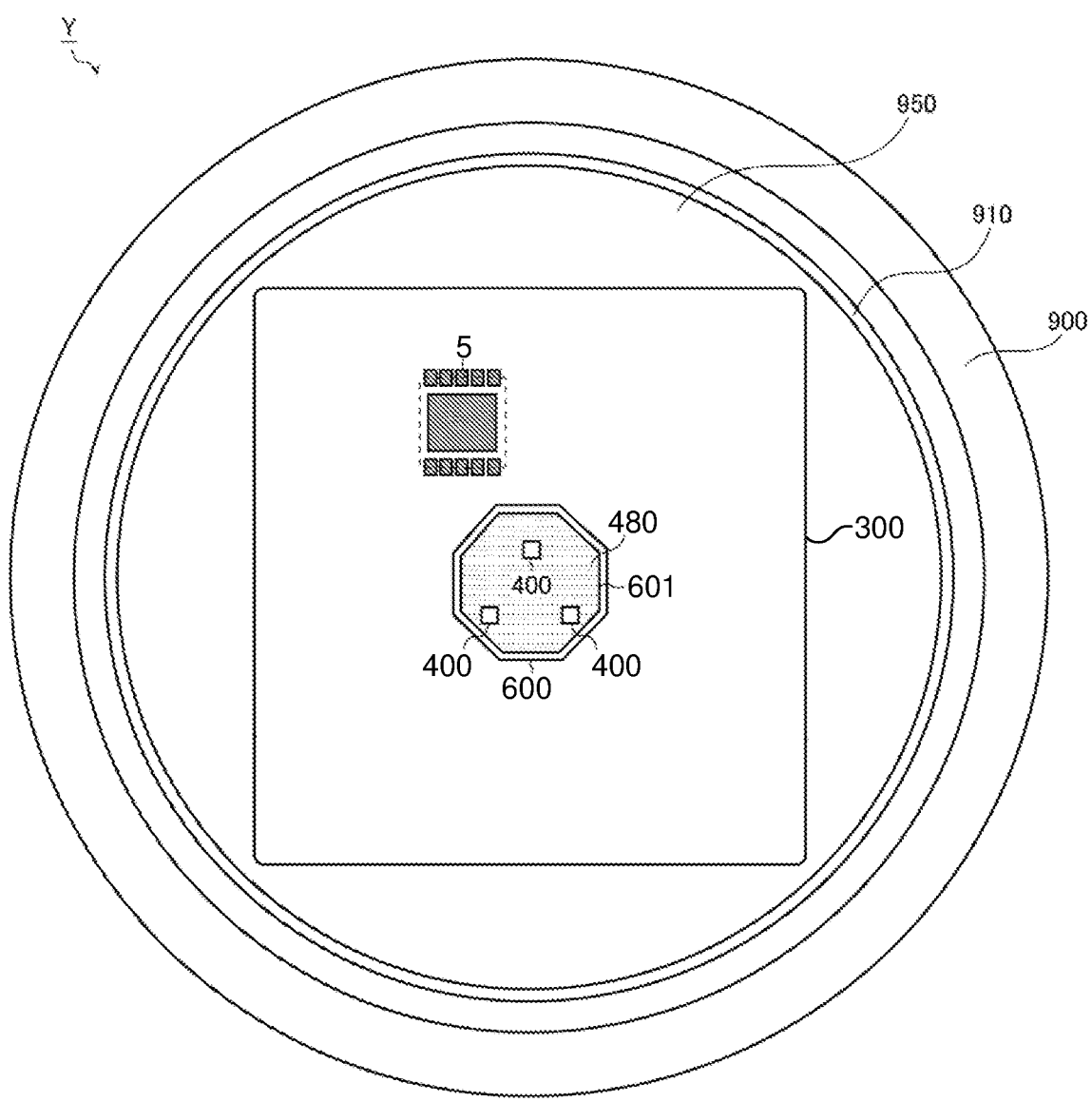
FIG. 7 is a plan view of one example of a socket-type LED module.

FIG. 7 is a plan view of a socket-type LED module Y as one example of implementation of the LED lighting device X1 described above. The socket-type LED module Y of this configuration example is, for example, a lighting appliance for vehicle onboard use, and includes a circuit board 300, LED chips 400, white resin 480, a reflector 600, an LED driving device 5, and a socket 900. While FIG. 7 shows, in a form corresponding to the example in FIG. 1, three LED chips 400 as those constituting the LED light source 10, this is not meant to limit the number of LED chips. In FIG. 7, for the sake of convenience, the electronic components that are externally connected to the LED driving device 5 are omitted from illustration.

The circuit board 300 has a substrate and wiring patterns (indicated by hatched regions) formed on it. The substrate is in a rectangular shape and is formed of, for example, glass epoxy resin. The wiring patterns are electrically conductive members laid on the surface of the substrate to have the LED chips 400 and various electronic components mounted on them, and are formed of, for example, metal such as Cu or Ag. On the top face of the circuit board 300, the LED driving device 5 and various externally connected components are mounted. Those electronic components are interconnected by the wiring patterns laid on the top and bottom faces of the circuit board 300 to form circuits, which make the LED chips 400 light in a desired lighting condition.

The reflector 600 is formed of, for example, white resin, and is fixed in a central region on the circuit board 300 so as to surround the LED chips 400. The reflector 600 serves to reflect upward the light shone sideways from the LED chips 400. The reflector 600 has a reflective surface 601 formed on it. The reflective surface 601 surrounds the LED chips 400. Though not visibly shown in FIG. 7, the reflective surface 601 is inclined such that, the farther away from the circuit board 300 in its thickness direction, the farther away from the LED chips 400 in the direction orthogonal to the thickness direction of the circuit board 300. That is, the reflective surface 601 is in a tapered shape such that its cross-sectional area orthogonal to the thickness direction of the circuit board 300 increases toward the open end of the reflector 600.

The white resin 480 is formed of a white resin material that does not transmit the light from the LED chips 400, and is one example of opaque resin. As will be understood from FIG. 7, the white resin 480 surrounds the LED chips 400 and at its outer circumferential edge reaches the reflective surface 601 of the reflector 600. Thus, in FIG. 7, the region extending from the LED chips 400 to the reflective surface 601 upward, downward, leftward, and rightward in the diagram is filled with the white resin 480.

The socket 900 is a part that, with the circuit board 300 mounted on it, is fitted to, for example, an automobile. The socket 900 is formed of, for example, synthetic resin by, for example, injection molding. The socket 900 has a mount 910, on which the circuit board 300 is mounted, and a base, at which the socket 900 is fitted to an automobile or the like. The mount 910 is in a cylindrical shape open at one end, and the circuit board 300 is mounted on the inner bottom face of the mount 910. To the inner bottom face of the mount 910 is fixed a heat sink plate 950, which is, for example, a circular plate made of aluminum. The circuit board 300 is mounted on the mount 910 of the socket 900 with the bottom face of the circuit board 300 bonded with adhesive to the top face of the heat sink plate 950.

The white resin 480 covers all over the annular region extending from the support substrates of the LED chips 400 to the reflective surface 601 of the reflector 600. Thus, the region surrounded by the reflective surface 601 is covered by the white resin 480 except the regions occupied by the LED chips 400. Thus, more of the light from the semiconductor layer of the LED chips 400 can be reflected. This helps enhance the brightness of the socket-type LED module Y. Moreover, the region of the circuit board 300 surrounded by the reflective surface 601 does not need to be treated specially to reflect light satisfactorily.

The reflector 600 with the reflective surface 601 allows brighter lighting right above the socket-type LED module Y.

In particular, in a configuration as described above where LED chips 400 (an LED light source 10) are provided in a socket-type LED module Y, the ambient temperature of the LED light source 10 tends to rise. It is therefore important to perform brightness control as in the LED driving device 5 of this embodiment to thereby suppress a drop in brightness with a rise in the LED ambient temperature. It is also important to perform temperature-based derating to reduce the output current Iout in a rage where the LED ambient temperature is high as in the LED driving device 5 of this embodiment to thereby suppress heat generation in the LED light source 10.

4. Applications

Figure 8:
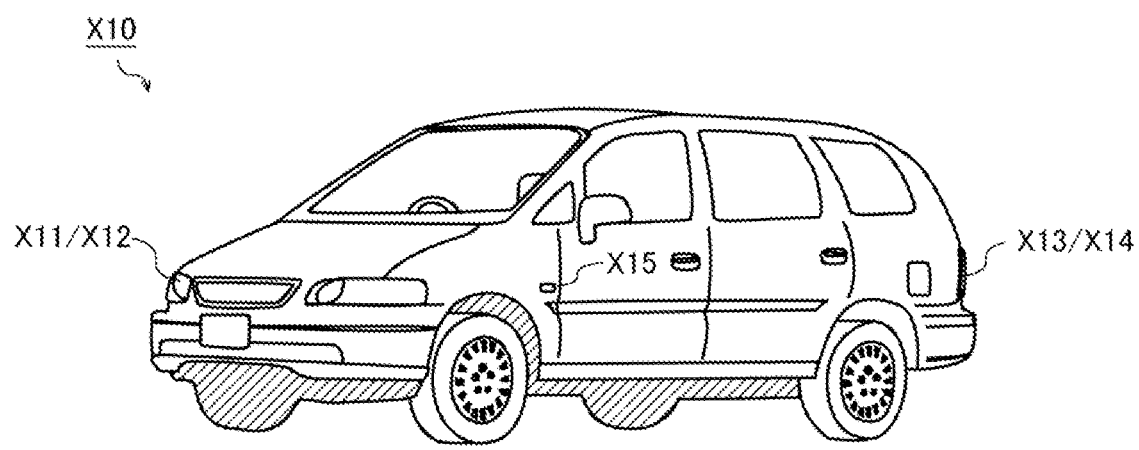
FIG. 8 is an exterior view (from the front) showing one example of a vehicle incorporating a light-emitting element driving device.
Figure 9:
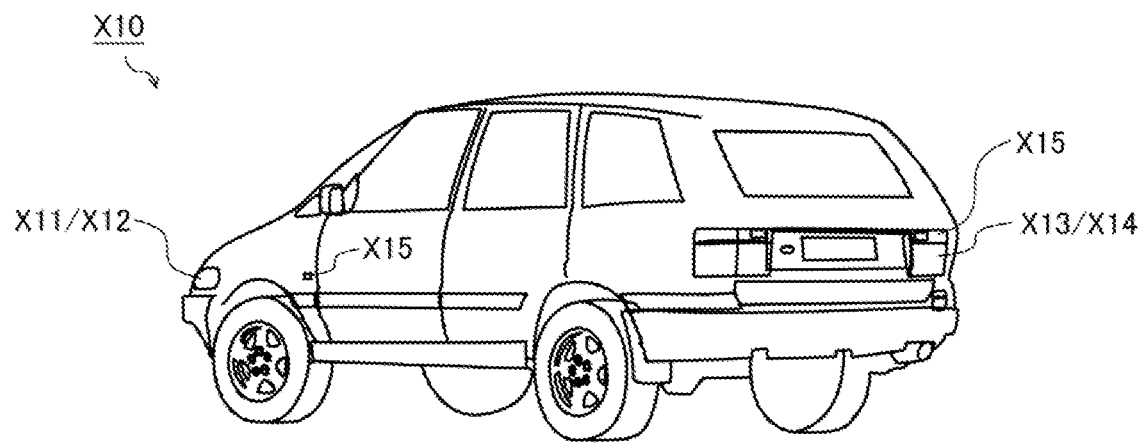
FIG. 9 is an exterior view (from the rear) showing one example of a vehicle incorporating a light-emitting element driving device.

The LED driving device 5 described above can be used, for example as shown in FIGS. 8 and 9, in a form incorporated in a lighting device on a vehicle X10, such as a headlight (including a high-beam light, a low-beam light, a parking light, a fog light, or the like) X11, a daylight running lamp (DRL) X12, a tail light (including a parking light, a back light, or the like) X13, a stop light X14, a turning light X15, or the like.

The LED driving device 5 may be provided in a form of a module together with an LED light source 10 as the target of driving (like the socket-type LED module Y described above), or may be provided as an IC proper separate from an LED light source 10.

5. Modifications

While an illustrative embodiment has been described above, it allows for any modifications within the scope of the technical ideas of the present invention.

For example, while the embodiment described above deals with, as an example, a configuration that use LEDs as light-emitting elements, this is not meant to limit how the present invention is to be implemented. It is possible to use, instead, any light-emitting elements other than LEDs that has such characteristics that their brightness falls as temperature rises.

For another example, while the embodiment described above deals with, as an example, a configuration where the current driver 1 is of a current-source type (i.e., the type of output achieved by passing the output current Iout from a power terminal to the anode of the LED light source 10), this is not meant to limit the configuration of the LED driving device 5. Instead, the current driver 1 may be of a current-sink type (i.e., the type of output achieved by drawing the output current Iout from the cathode of the LED light source 10 to a ground terminal).

6. Notes

As described above, for example, according to one aspect of the present disclosure, a light-emitting element driving device (5) includes:

a first external terminal (SET terminal) connectable to a first setting resistor (Rset);

a second external terminal (SET_TH terminal) connectable to a first thermistor (TH1) with a negative coefficient arranged beside a light-emitting element light source (10);

a current setter (2) configured to generate a setting current (Iset) based on the resistance value of the first setting resistor;

a current adder (3) configured to generate an addition current (Iadd) with a negative coefficient to the resistance value of the first thermistor; and a current driver (1) configured to generate an output current (Iout) that passes through the light-emitting element light source connected between an application terminal for a supply voltage (Vin) and a ground terminal based on a reference current (Iref) which is the sum of the setting current and the addition current. (A first configuration.)

In the first configuration described above, the second external terminal (SET_TH) may be connectable to a second setting resistor (Rset_th) connected in series with the first thermistor (TH1), and the current adder may generate the addition current with a negative coefficient to the combined resistance of the first thermistor and the second setting resistor. (A second configuration.)

The second configuration described above may further include: a third external terminal (THD terminal) connectable to a second thermistor (TH2) with a negative coefficient arranged beside the light-emitting element light source; and a constant current source (4) connected to the third external terminal. The current adder may generate the addition current with a positive coefficient to the terminal voltage (Vthd) at the third external terminal. (A third configuration.)

In the third configuration described above, the current setter may generate the setting current with a positive coefficient to the terminal voltage. (A fourth configuration.)

In the fourth configuration described above, the current setter may include: a first output transistor (2A) arranged in the path across which the setting current passes; and a first error amplifier (2B) having: a first input terminal connected to a first node at which the first terminal of the first output transistor and the first external terminal (SET terminal) are connected together; a second input terminal connected to an application terminal for the terminal voltage (Vthd); and an output terminal connected to the control terminal of the first output transistor. (A fifth configuration.)

In any of the first to fifth configurations described above, the current adder may include: a second output transistor (3A) arranged in the path across which the addition current passes; and a second error amplifier (3B) having: a first input terminal connected to a second node at which the first terminal of the second output transistor and the second external terminal (SET_TH) are connected together; a second input terminal connected to an application terminal for a reference voltage (Vthd); and an output terminal connected to the control terminal of the second output transistor. (A sixth configuration.)

The sixth configuration described above may further include: a third external terminal (THD terminal) connectable to a second thermistor (TH2) with a negative coefficient arranged beside the light-emitting element light source; and a constant current source (4) connected to the third external terminal. The second external terminal (SET_TH) may be connectable to a second setting resistor (Rset_th) connected in series with the first thermistor, and the reference voltage may be the terminal voltage (Vthd) at the third external terminal. (A seventh configuration.)

According to another aspect of the present disclosure, a lighting device (X1) includes: the light-emitting element driving device (5) of any of the first to seventh configurations described above; and the light-emitting element light source (10). (An eighth configuration.)

In the eighth configuration described above, the light-emitting element light source may be an LED light source. (A ninth configuration.)

The eighth or ninth configuration described above may further include: a circuit board (300) having formed on it wiring patterns on which to mount the light-emitting element light source and the light-emitting element driving device; and a socket (900) on which to mount the circuit board. (A tenth configuration.)

According to another aspect of the present disclosure, a vehicle (X10) includes the lighting device of any of the eighth to tenth configurations described above.

Technical Scheme II

Figure 10:
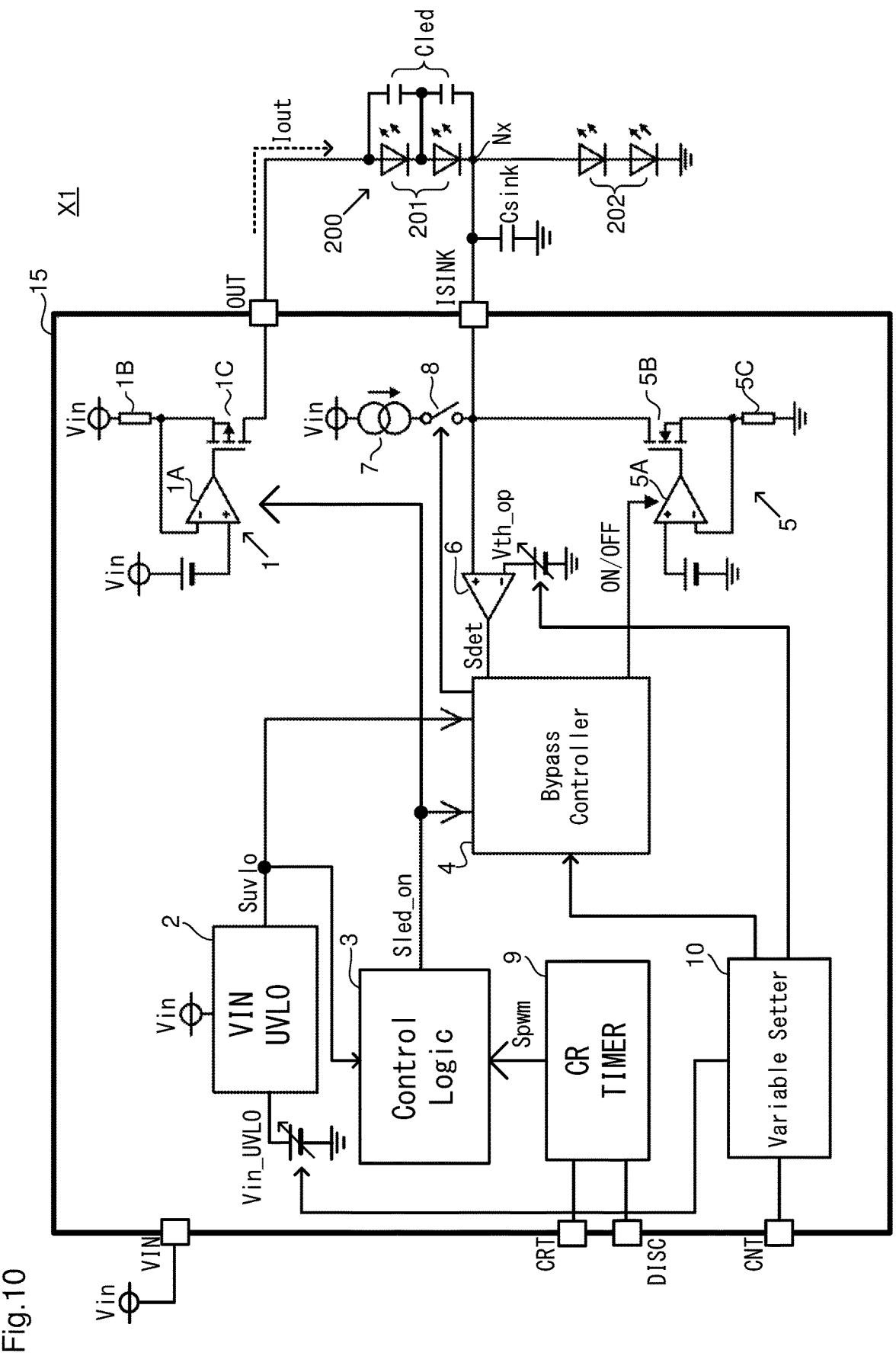
FIG. 10 is a diagram showing the overall configuration of an LED lighting device according to an illustrative embodiment.

Technical Scheme II will be described below. It should be noted that the reference signs used to identify circuit elements and signals in the following description are unrelated to those used for Technical Scheme I described previously 1. LED Lighting Device FIG. 10 is a diagram showing the overall configuration of an LED lighting device X1 according to an illustrative embodiment. The LED lighting device X1 is a vehicle-mounted light that is lit by being supplied with a supply voltage Vin from an unillustrated battery. The LED lighting device X1 can be, for example, a headlight, daylight running light, taillight, stoplight, or turning light. The battery is the power source of the vehicle that incorporates the LED lighting device X1, and is implemented suitably with a lead storage battery, lithium-ion battery, or the like.

As shown in FIG. 10, the LED lighting device X1 includes an LED driving device 15 and an LED light source 200. The LED driving device 15 is a semiconductor integrated circuit device (what is called an LED driver IC) that operates by being supplied with the supply voltage Vin from the above-mentioned battery to generate an output current Iout to be supplied to the LED light source 200.

The LED driving device 15 has, as external terminals for electrical connection with the outside, a VIN terminal, an OUT terminal, an ISINK terminal, a CRT terminal, a DISC terminal, and a CNT terminal. The VIN terminal is connected to an application terminal for the supply voltage Vin. That is, the LED driving device 15 is supplied with the supply voltage Vin via the VIN terminal.

The LED light source 200 is an LED string configured with a plurality of LED chips (light-emitting elements) connected in series. The LED light source 200 divides into a high-potential-side LED 201 (high-potential-side light source) and a low-potential-side LED 202 (low-potential-side light source).

The high-potential-side LED 201 is configured with at least one LED chip. In the example shown in FIG. 10, the high-potential-side LED 201 is configured with two LED chips connected in series. The anode of the high-potential-side LED 201 is connected to the OUT pin of the LED driving device 15 (i.e., an output terminal for the output current Iout).

The low-potential-side LED 202 is configured with at least one LED chip. In the example shown in FIG. 10, the low-potential-side LED 202 is configured with two LED chips connected in series. The cathode of the low-potential-side LED 202 is connected to a ground terminal. The node Nx at which the cathode of the high-potential-side LED 201 and the anode of the low-potential-side LED 202 are connected together is connected to the ISINK terminal. The reason for this will be described later.

The LED driving device 15 has, integrated in it as its internal blocks, a current driver 1, a UVLO circuit 2, a control logic 3, a bypass controller 4, a constant current circuit 5, a comparator 6, a constant current source 7, a switch 8, a CR timer 9, and a variable setter 10.

Note that FIG. 10 shows not all of the internal blocks of the LED driving device 15; the LED driving device 15 has, in addition to the blocks shown in FIG. 10, various fault detectors, a fault indicator for giving out fault indications, an output current setter for setting the output current Iout, etc. The fault detectors include an LED open detector for detecting an open fault in the LED light source 200 based on the voltage at the OUT terminal, an output ground-short detector for detecting a ground short circuit at the OUT terminal based on the voltage at the OUT terminal, a temperature protection circuit (TSD), etc.

The current driver 1 performs constant current control on the output current Iout such that the output current Iout that passes through the LED light source 200 remains equal to a predetermined target value. The current driver 1 includes an error amplifier 1A, a sense resistor 1B, and a PMOS transistor 1C. One terminal of the sense resistor 1B is connected to an application terminal for the supply voltage Vin. The other terminal of the sense resistor 1B is connected to the inverting input terminal (−) of the error amplifier 1A and to the source of the PMOS transistor 1C. The non-inverting input terminal (+) of the error amplifier 1A is connected to an application terminal for a reference voltage. The output terminal of the error amplifier 1A is connected to the gate of the PMOS transistor 1C. The drain of the PMOS transistor 1C is connected to the OUT terminal.

The UVLO (undervoltage lock-out) circuit 2 is a circuit that detects an undervoltage in the supply voltage Vin. The UVLO circuit 2 compares the supply voltage Vin with a UVLO threshold voltage Vin_UVLO to output, as the comparison result, a UVLO detection signal Suvlo.

The control logic 3 serves as the principal agent that comprehensively controls the operation of the entire LED driving device 15. For example, the control logic 3 controls the suspending of the output current Iout according to detection results from the various fault detectors (LED open detector, output ground-short detector, temperature protection circuit, etc.) and makes the fault indicator give out indications.

2. CR Timer

Figure 11:
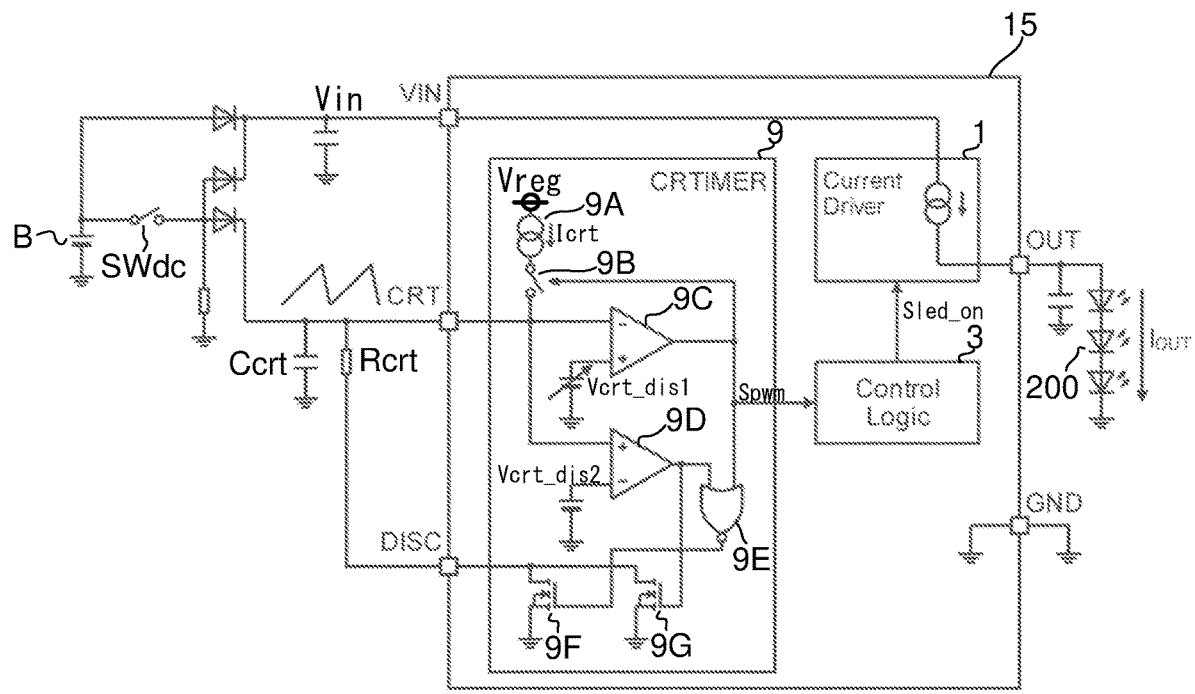
FIG. 11 is a diagram showing an example of the internal configuration of a CR timer.

Now, the CR timer 9 will be described with reference to FIG. 11. FIG. 11 is a diagram showing an example of the internal configuration of the CR timer 9. The CR timer 9 is configured to allow PMW dimming with external components (a capacitor Ccrt and a resistor Rcrt) connected to the CRT terminal and the DISC terminal.

As shown in FIG. 11, the CR timer 9 includes a constant current source 9A, a switch 9B, a comparator 9C, a comparator 9D, a NOR circuit 9E, an NMOS transistor 9F, and an NMOS transistor 9G.

To the CRT terminal, one terminal of the capacitor Ccrt is externally connected. To the CRT terminal is also connected one terminal of the resistor Rcrt. The other terminal of the resistor Rcrt is connected to the DISC terminal.

The comparator 9C compares the voltage at the CRT terminal with a reference voltage Vcrt_dis1. Between an application terminal for an internal voltage Vreg and the CRT terminal, the constant current source 9A and the switch 9B are provided. The internal voltage Vreg is generated based on the supply voltage Vin by an unillustrated internal voltage source. The switch 9B is turned on and off according to the output of the comparator 9C.

The comparator 9D compares the voltage at the CRT terminal with a reference voltage Vcrt_dis2 (>Vcrt_dis1). One input terminal of the NOR circuit 9E is connected to the output terminal of the comparator 9C. The other input terminal of the NOR circuit 9E is connected to the output terminal of the comparator 9D.

The drain of the NMOS transistor 9F is connected to the DISC terminal. The source of the NMOS transistor 9F is connected to the ground terminal. The gate of the NMOS transistor 9F is connected to the output terminal of the NOR circuit 9E.

The drain of the NMOS transistor 9G is connected to the DISC terminal. The source of the NMOS transistor 9G is connected to the ground terminal. The gate of the NMOS transistor 9G is connected to the output terminal of the comparator 9D.

Between the battery B, which generates the supply voltage Vin, and the CRT terminal, a switch SWdc is arranged. During use in a PWM dimming mode, the switch SWdc is kept off. In this case, a triangular wave is generated at the CRT terminal.

Specifically, if the voltage at the CRT terminal is lower than the reference voltage Vcrt_dis1, the output of the comparator 9C is at high level, the switch 9B is on, and the constant current source 9A charges the capacitor Ccrt via the CRT terminal. As charging progresses, when the voltage at the CRT terminal becomes higher than the reference voltage Vcrt_dis1, the output of the comparator 9C turns to low level, and the switch 9B is turned off. At this time, since the outputs of the comparators 9C and 9D are both at low level, the output of the NOR circuit 9E turns to high level, and the NMOS transistor 9F is turned on. Thus, the capacitor Ccrt is discharged via the DISC terminal. Moreover, when the output of the comparator 9C turns to low level as mentioned above, the reference voltage is switched from Vcrt_dis1 to Vcrt_cha (<Vcrt_dis1).

As discharging progresses, the voltage at the CRT terminal falls and when it becomes lower than the reference voltage Vcrt_cha, the output of the comparator 9C turns to high level, and the switch 9B is turned on. At this time, the capacitor Ccrt starts to be charged, and the reference voltage for the comparator 9C is switched from Vcrt_cha to Vcrt_dis1. Through repetition of this sequence of operation, a triangular wave is generated at the CRT terminal.

As the triangular wave is generated, the comparator 9C outputs a PWM dimming signal Spwm in the form of pulses. Based on the PWM dimming signal Spwm, the control logic 3 generates an LED on signal Sled_on to turn on and off the current driver 1. During the rising period of the triangular wave (i.e., the high-level period of the PWM dimming signal Spwm), the current driver 1 (hence the output current Iout) is off; during the falling period of the triangular wave (i.e., the low-level period of the PWM dimming signal Spwm), the current driver 1 (hence the output current Iout) is on. The frequency and the on-duty of PWM dimming can be set as desired by adjusting the resistance value of the resistor Rcrt and the capacitance value of the capacitor Ccrt.

On the other hand, during use in a DC dimming mode, the switch SWdc is kept on, so that the CRT terminal is fed with the supply voltage Vin. Thus, when the voltage at the CRT terminal becomes higher than the reference voltage Vcrt_dis1, the PWM dimming signal Spwm is held at low level, and the current driver 1 is kept on.

If the voltage at the CRT terminal becomes higher than the reference voltage Vcrt_dis2, the output of the comparator 9D turns to high level, and thus a shift takes place from a state where the NMOS transistor 9F is on and the NMOS transistor 9G is off to a state where the NMOS transistor 9F is off and the NMOS transistor 9G is on. The NMOS transistor 9G has a higher on-resistance than the NMOS transistor 9F, and thus reducing the current fed to the DISC terminal helps suppress power consumption in the IC.

In a case where use is intended only in the DC dimming mode, the CRT terminal and the VIN terminal are short-circuited together and the DISC terminal is left open.

3. Bypass Function

Next, with reference back to FIG. 10, the bypass function available on the LED driving device 15 will be described. As mentioned earlier, the node Nx at which the high-potential-side LED 201 and the low-potential-side LED 202 are connected together is connected to the ISINK terminal.

The bypass controller 4 and the constant current circuit 5 constitute a bypass function block. The constant current circuit 5 includes an error amplifier 5A, an NMOS transistor 5B, and a sense resistor 5C. The drain of the NMOS transistor 5B is connected to the ISINK terminal. The source of the NMOS transistor 5B is connected to one terminal of the sense resistor 5C. The other terminal of the sense resistor 5C is connected to the ground terminal. The node at which the NMOS transistor 5B and the sense resistor 5C are connected together is connected to the inverting input terminal (−) of the error amplifier 5A. The non-inverting input terminal (+) of the error amplifier 5A is connected to an application terminal for a reference voltage. So configured, the constant current circuit 5 performs constant current control on the current that is drawn in via the ISINK terminal.

The bypass controller 4 turns on and off the constant current circuit 5. With the constant current circuit 5 on, the output current Iout passes through the high-potential-side LED 201 and is drawn into the constant current circuit 5 via the ISINK terminal. That is, the low-potential-side LED 202 is bypassed. In this way, if the supply voltage Vin is low, the low-potential-side LED 202 is bypassed to reduce the number of LED chips connected in series and thereby reduce the total forward voltage across the LED light source 200; this makes it possible to keep the LED light source 200 lit.

Incidentally, when the supply voltage Vin is high, the constant current circuit 5 is kept off; thus, the output current Iout passes through the high-potential-side LED 201 and then through the low-potential-side LED 202, so that all the LED chips in the LED light source 200 are lit.

4. Open Detection Function

When the supply voltage Vin rises (at the start-up of the supply voltage Vin), control proceeds as follows: while the supply voltage Vin is low, the constant current circuit 5 is kept on so that while the low-potential-side LED 202 is bypassed the high-potential-side LED 201 is lit; thereafter, when the supply voltage Vin becomes high enough, the constant current circuit 5 is turned off. Here, if an open fault occurs on the low-potential side of the node Nx (which can be an open fault in the low-potential-side LED 202), with the constant current circuit 5 off the output current Iout ceases to pass, and thus the high-potential-side LED 201 goes out. When this happens, to the human eye, the LED light source 200 appears to be lit momentarily and then extinguished. To prevent this, the LED driving device 15 of this embodiment is provided with a function (open detection function) of detecting an open fault on the low-potential side of the node Nx.

The comparator 6 is provided to implement the open detection function mentioned above. The non-inverting input terminal (+) of the comparator 6 is connected to the ISINK terminal. The inverting input terminal (−) of the comparator 6 is connected to an application terminal for an open detection threshold voltage Vth_op. The comparator 6 compares the voltage at the ISINK terminal with the open detection threshold voltage Vth_op to output, as the comparison result, a detection signal Sdet to the bypass controller 4.

The constant current source 7 and the switch 8 too are provided to implement the open detection function. The constant current source 7 and the switch 8 are provided between the application terminal for the supply voltage Vin and the ISINK terminal.

Now, a description will be given of how the open detection function proceeds at the start-up of the supply voltage Vin. When the supply voltage Vin rises from 0 V, the bypass controller 4 keeps the constant current circuit 5 off.

As the supply voltage Vin rises, when it becomes higher than the UVLO threshold voltage Vin_UVLO, the UVLO circuit 2 outputs a UVLO detection signal Suvlo indicating "UVLO inactive." If the UVLO detection signal Suvlo indicates "UVLO inactive" and in addition the LED on signal Sled_on indicates "on," the bypass controller 4 turns the switch 8 on.

Figure 12:
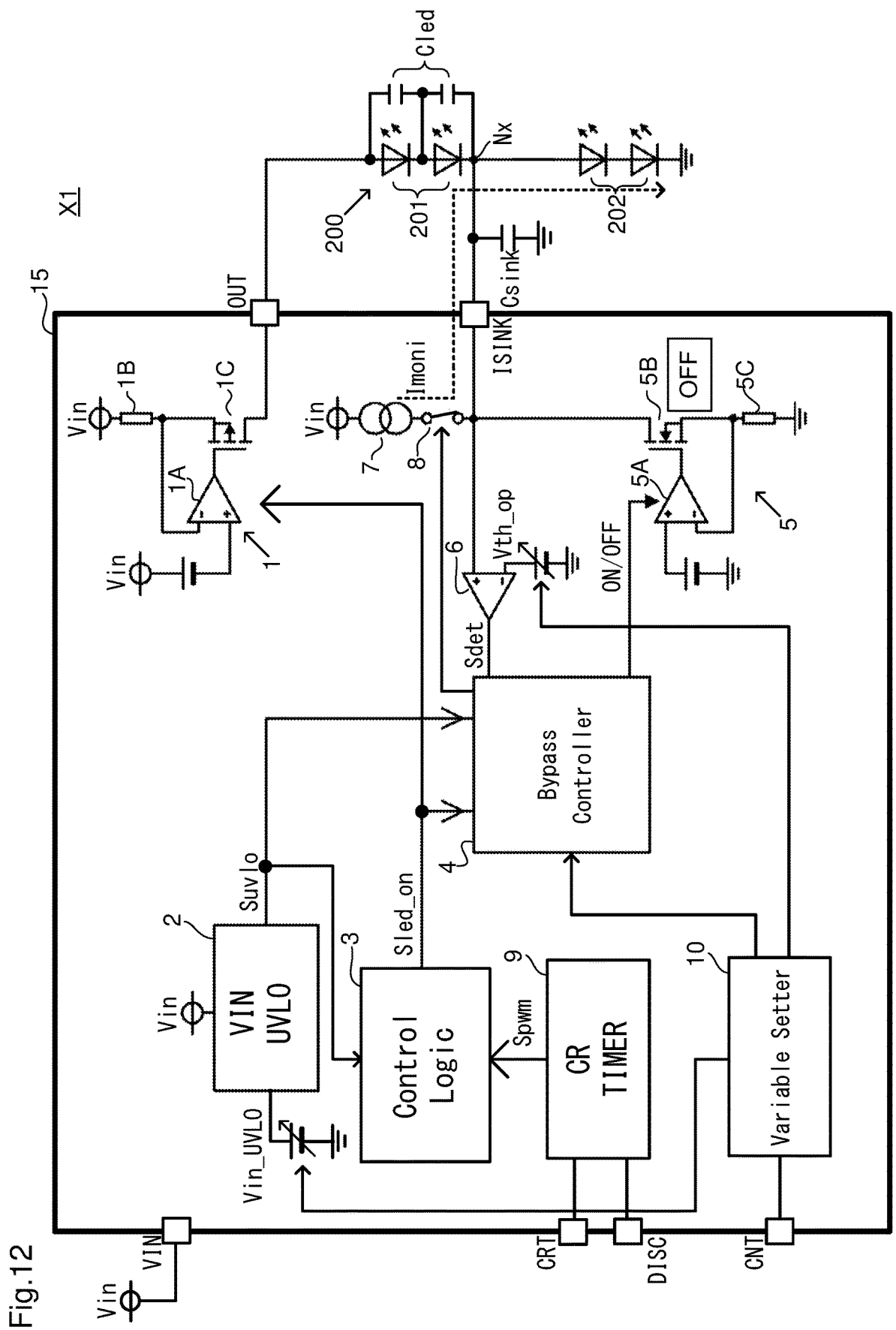
FIG. 12 is a diagram showing a case where no open fault is present on the low-potential side of a node Nx.

Here, as shown in FIG. 12, if no open fault is present on the low-potential side of the node Nx, a constant current Imoni (broken-line arrow) passes through the low-potential-side LED 202 via the switch 8 in the on state and the ISINK terminal. Here, seeing that the voltage at the ISINK terminal at that time is close to the total forward voltage across the low-potential-side LED 202, the open detection threshold voltage Vth_op is set at a voltage higher than the voltage at the ISINK terminal. Thus, judging that the voltage at the ISINK terminal is lower than the open detection threshold voltage Vth_op, the comparator 6 outputs a low-level detection signal Sdet indicating that no open fault is present.

In this case, the bypass controller 4 turns the constant current circuit 5 on. Thus, the low-potential-side LED 202 is bypassed, and the output current Iout is drawn from the high-potential-side LED 201 to the ISINK terminal; thus, the high-potential-side LED is lit. Thereafter, when the supply voltage Vin becomes high enough, the bypass controller 4 turns the constant current circuit 5 off and cancels bypassing; thus, the output current Iout passes through the high-potential-side LED 201 and then through the low-potential-side LED 202, so that all the LED chips in the LED light source 200 are lit.

Figure 13:
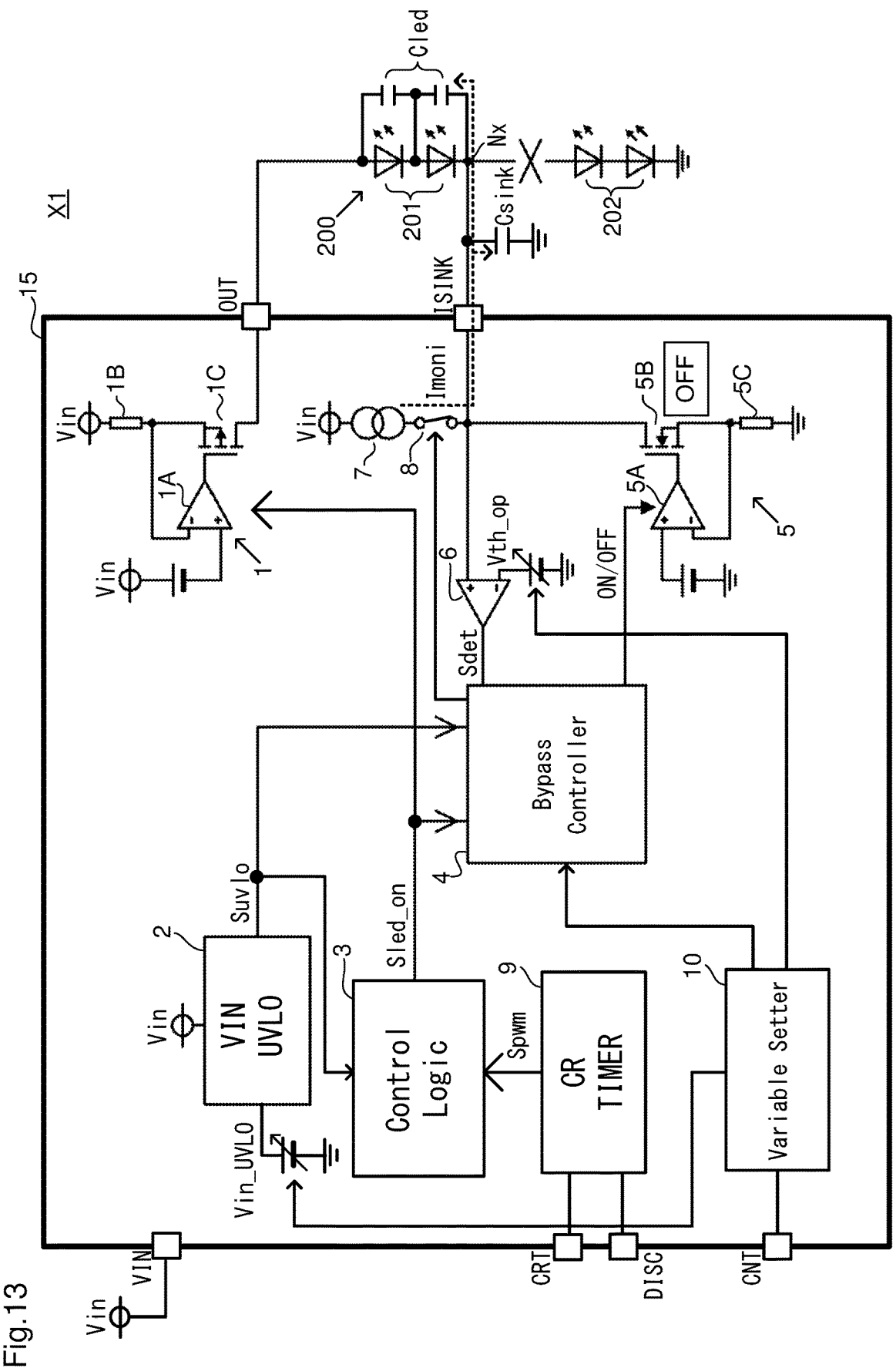
FIG. 13 is a diagram showing a case where an open fault is present on the low-potential side of a node Nx.

By contrast, when the switch 8 is turned on as described above, if as shown in FIG. 13 an open fault is present on the low-potential side of the node Nx, the constant current Imoni charges, via the ISINK terminal, a parasitic capacitance Cled of the high-potential-side LED 201 and an externally connected capacitive element Csink. The capacitive element Csink is an element, externally connected to the ISINK terminal, for coping with EMC (electromagnetic compatibility) tests. An EMC test is a BCI (bulk current injection) test involving noise injection into a power line, and the capacitive element Csink is provided to suppress fluctuation of the voltage at the ISINK terminal during the test. The voltage at the ISINK terminal that results from the charging mentioned above is compared with the open detection threshold voltage Vth_op by the comparator 6. In this case, the voltage at the ISINK terminal becomes higher than the open detection threshold voltage Vth_op, and thus the comparator 6 outputs a high-level detection signal Sdet indicating that an open fault is present.

Here, the open detection threshold voltage Vth_op needs to be equal to or lower than the UVLO threshold voltage Vin_UVLO. The reason is as follows. In the DC dimming mode, the PWM dimming signal Spwm output from the CR timer 9 has a fixed level and the LED on signal Sled_on at the time of UVLO inactivation indicates "on." Thus the bypass controller 4 immediately turns the switch 8 on but the voltage at the ISINK terminal does not become equal to or higher than the supply voltage Vin. Thus, if the open detection threshold voltage Vth_op is higher than the UVLO threshold voltage Vin_UVLO, the voltage at the ISINK terminal is lower than the open detection threshold voltage Vth_op, and the comparator 6 may erroneously judge that no open fault is present.

Also, the bypass controller 4 needs to stay on standby, after turning on the switch 8 until checking for an open fault based on the detection signal Sdet output from the comparator 6, for a wait time required for the voltage at the ISINK terminal to become higher than the open detection threshold voltage Vth_op. The required waiting time has to fulfill the condition expressed by Formula (1) below.

$$Vth\_op < Imoni \times Twait/C$$

where $C = Cled + Csink$  (1)

After the standby for the wait time Twait above, the bypass controller 4 checks for an open fault, and if an open fault is present (if Sdet is at high level), the bypass controller 4 keeps the constant current circuit 5 off. In this way, the high-potential-side LED 201 is prevented from being momentarily lit due to an open fault.

Figure 14:
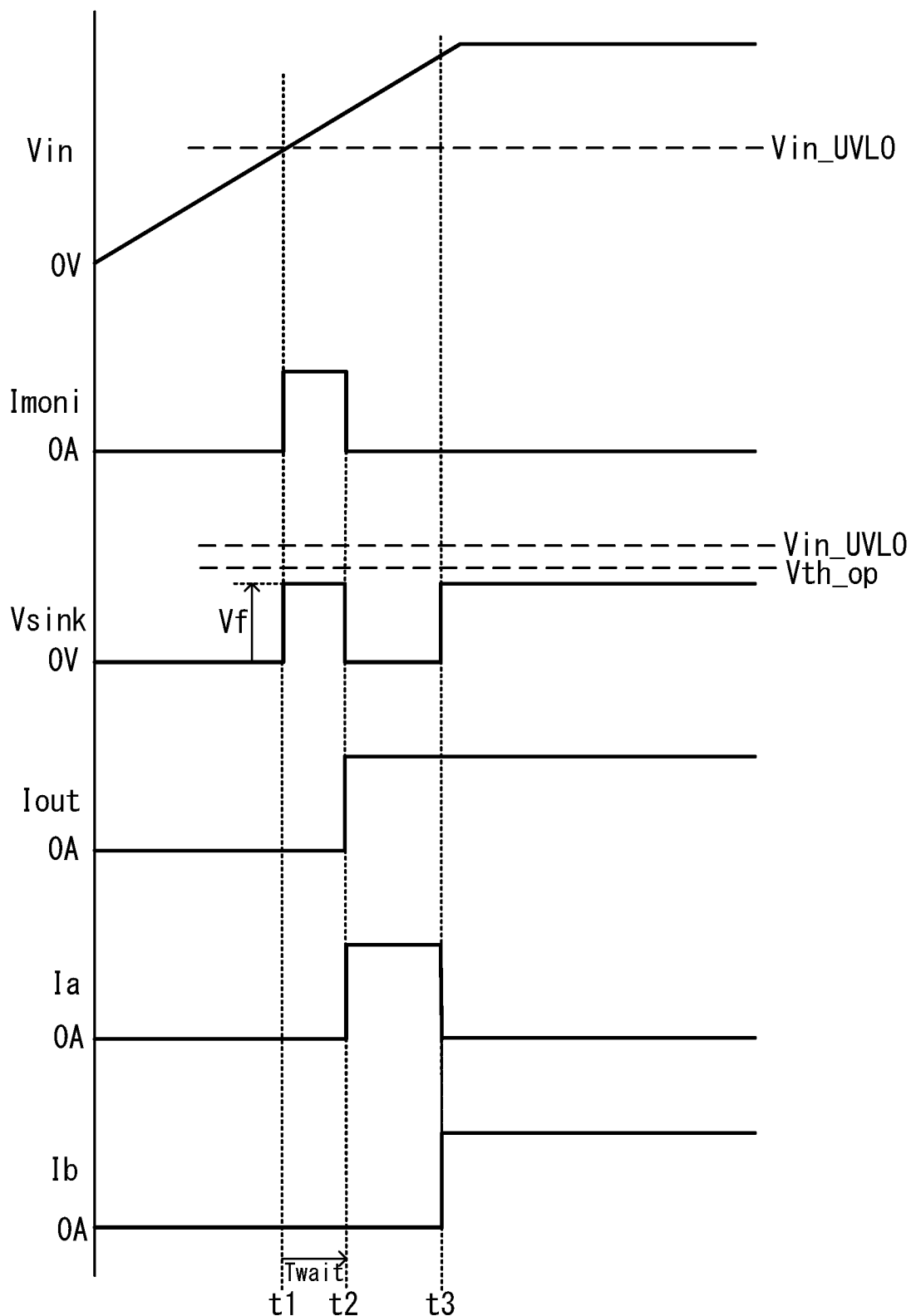
FIG. 14 is a diagram showing the operation observed when no open fault is present on the low-potential side of a node Nx.
Figure 15:
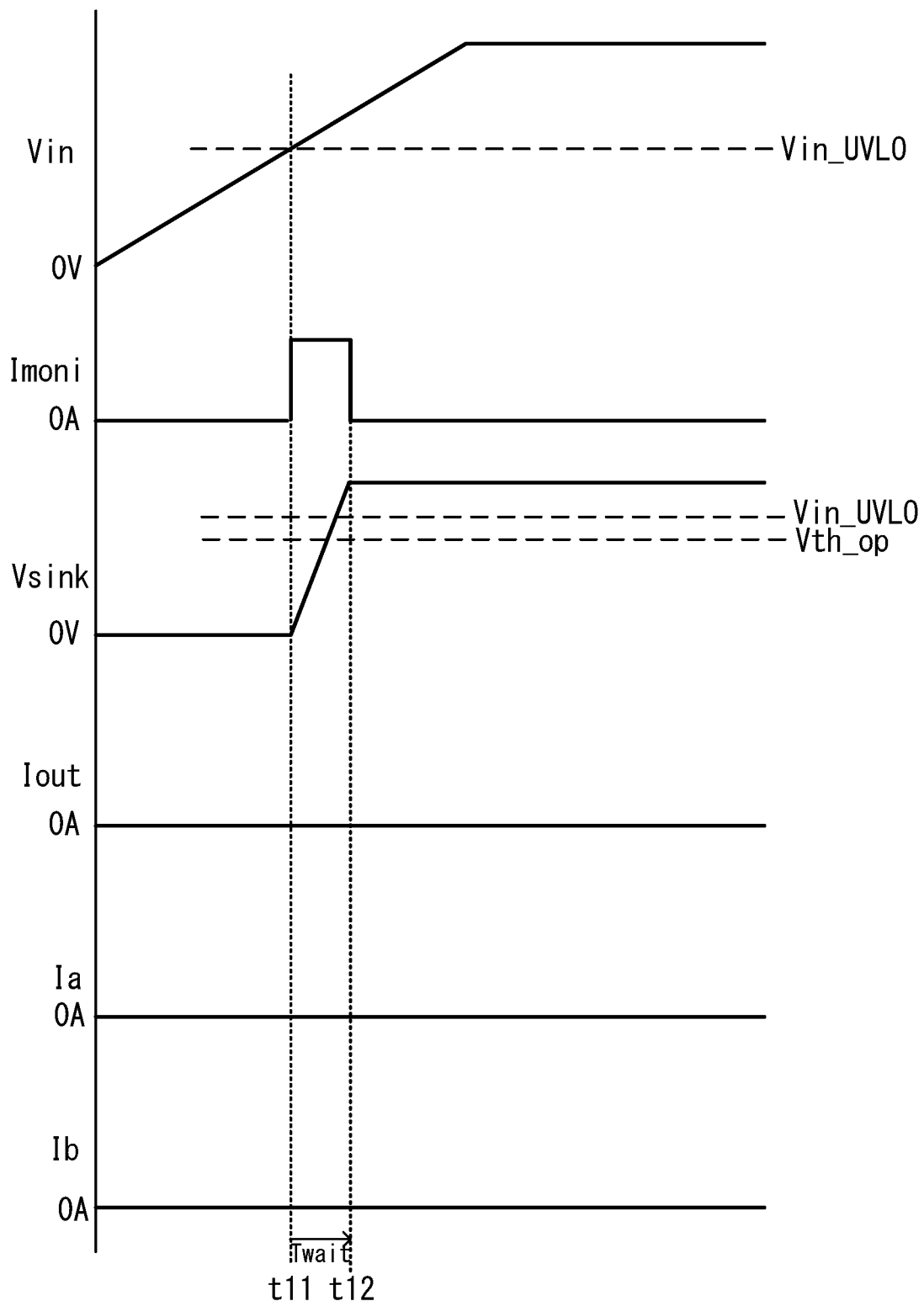
FIG. 15 is a diagram showing the operation observed when an open fault is present on the low-potential side of a node Nx.
Figure 16:
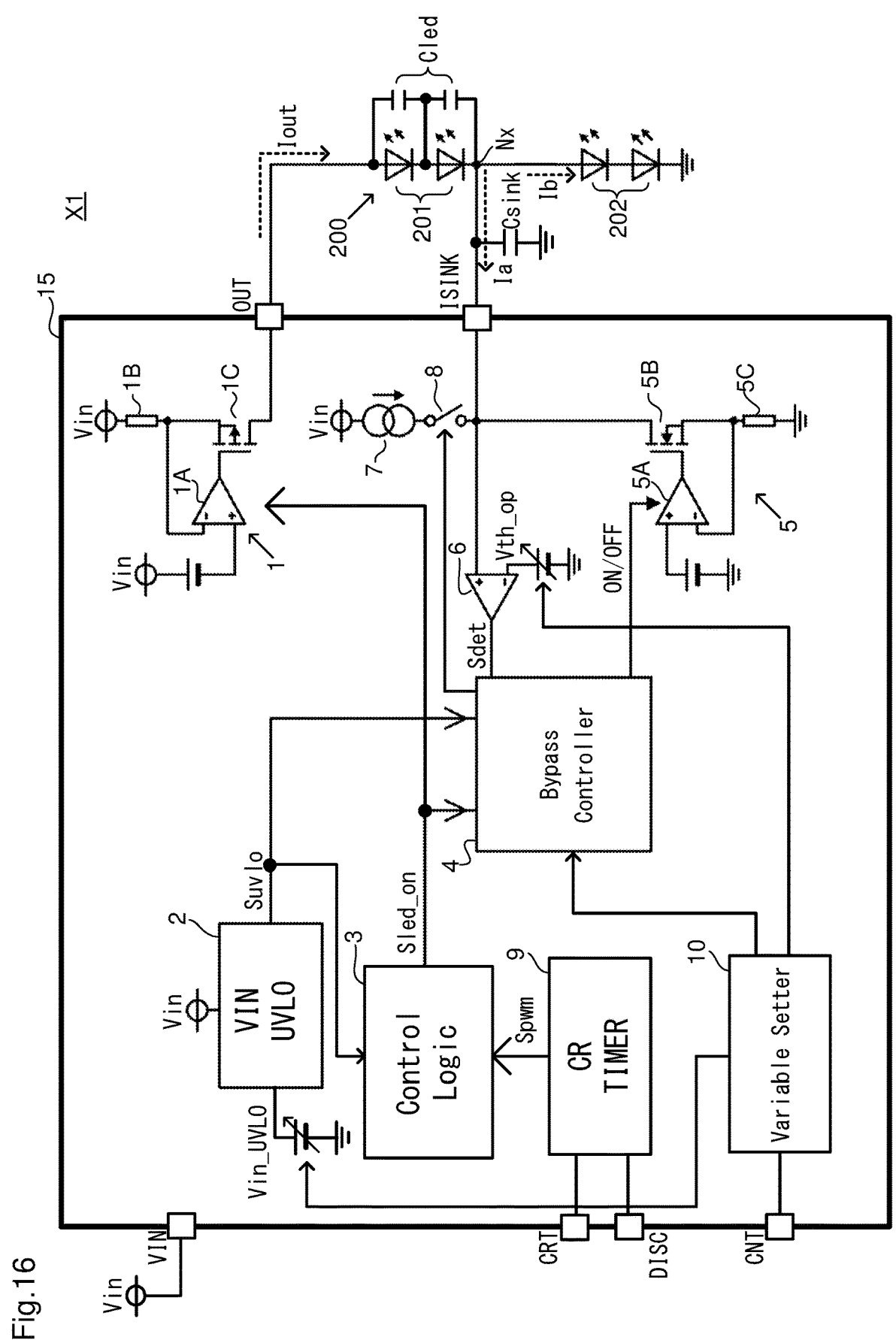
FIG. 16 is a diagram showing a first output current and a second output current.

Now, with reference to FIGS. 14 and 15, a description will be given of the operation at the start-up of the supply voltage Vin. FIGS. 14 and 15 are timing charts depicting the waveforms of, from top down, the supply voltage Vin, the constant current Imoni, the voltage Vsink at the ISINK terminal, the output current Iout, a first output current Ia, and a second output current Ib. As shown in FIG. 16, the first output current Ia is an output current that passes along a path leading from the node Nx to the ISINK terminal, and the second output current Ib is an output current that passes along a path leading from the node Nx to the low-potential-side LED 202. As shown in FIGS. 14 and 15, the open detection threshold voltage Vth_op is equal to or lower than the UVLO threshold voltage Vin_UVLO.

FIG. 14 is a diagram showing the operation observed with no open fault present on the low-potential side of the node Nx. Note that FIG. 14 relates to the DC dimming mode and so does FIG. 15, which will be referred to later.

As shown in FIG. 14, when the supply voltage Vin rises from 0 V until it becomes equal to or higher than the UVLO threshold voltage Vin_UVLO (time point t1), UVLO is inactivated and the LED on signal Sled_on indicates "on"; thus, the switch 8 is turned on immediately. As a result, the constant current Imoni rises, so that the voltage Vsink comes to have a value close to the total forward voltage Vf of the low-potential-side LED 202. The voltage Vsink is lower than the open detection threshold voltage Vth_op.

The bypass controller 4 stays on standby for a wait time Twait from time point t1 mentioned above and then, based on the detection signal Sdet, judges that no open fault is present (time point t2). As a result, the bypass controller 4 turns off the switch 8 and turns on the constant current circuit 5. Thus, the first output current Ia (=Iout) is drawn in via the ISINK terminal, and the high-potential-side LED 201 is lit.

After that, when the supply voltage Vin becomes high enough, the bypass controller 4 turns off the constant current circuit 5 (time point t3). As a result, the second output current Ib (=Iout) passes through the low-potential-side LED 202. Thus, all the LED chips in the LED light source 200 are lit.

By contrast, FIG. 15 shows the operation observed when an open fault is present on the low-potential side of the node Nx. As shown in FIG. 15, when the supply voltage Vin rises from 0 V until it becomes equal to or higher than the UVLO threshold voltage Vin_UVLO (time point t11), UVLO is inactivated and the LED on signal Sled_on indicates "on"; thus, the switch 8 is turned on immediately.

Then, the constant current Imoni rises and, as the parasitic capacitance Cled and the capacitive element Csink are charged with the constant current Imoni, the voltage Vsink rises. At the lapse of the wait time Twait from the time point t11 mentioned above, that is, at time point t12, the voltage Vsink is higher than the open detection threshold voltage Vth_op. Thus, based on the detection signal Sdet, the bypass controller 4 judges that an open fault is present; it thus turns the switch 8 off and keeps the constant current circuit 5 off. Thus, no output current Tout passes, and the high-potential-side LED 201 are not lit.

5. Variable Setting Function

Next, the variable setter 10 will be described.

The number of LED chips constituting the low-potential-side LED 202 may vary. For example, while the number is two in FIG. 1, it may instead be, for example, three. In such cases, as the number varies, the total forward voltage across the low-potential-side LED 202 varies. Here, as mentioned earlier, the open detection threshold voltage Vth_op needs to be set to be higher than the total forward voltage across the low-potential-side LED 202, and thus the open detection threshold voltage Vth_op needs to be varied according to the number of LED chips constituting the low-potential-side LED 202.

Moreover, as mentioned earlier, the UVLO threshold voltage Vin_UVLO needs to be equal to or higher than the open detection threshold voltage Vth_op, and thus the open detection threshold voltage Vth_op too needs to be varied as the open detection threshold voltage Vth_op varies.

Furthermore, Formula (1) above dictates that the wait time Twait too has to be varied as the open detection threshold voltage Vth_op varies. Incidentally, the capacitive element Csink is not essential and may be omitted, in which case the wait time Twait may be a fixed value.

Accordingly, in the LED driving device 15, according to the number of LED chips constituting the low-potential-side LED 202, the variable setter 10 variably sets the open detection threshold voltage Vth_op, the UVLO threshold voltage Vin_UVLO, and the wait time Twait in the bypass controller 4 in a manner coordinated among these. The variable setter 10 performs such variable setting via the CNT terminal.

For example, the variable setter 10 discriminates two states at the CNT terminal, namely whether it is open or is fed with GND (the ground potential), and performs variable setting according to the discrimination result.

For another example, the variable setter 10 discriminates three states at the CNT terminal, namely whether it is fed with the supply voltage Vin, is open, or is fed with GND, and performs variable setting according to the discrimination result.

Figure 17:
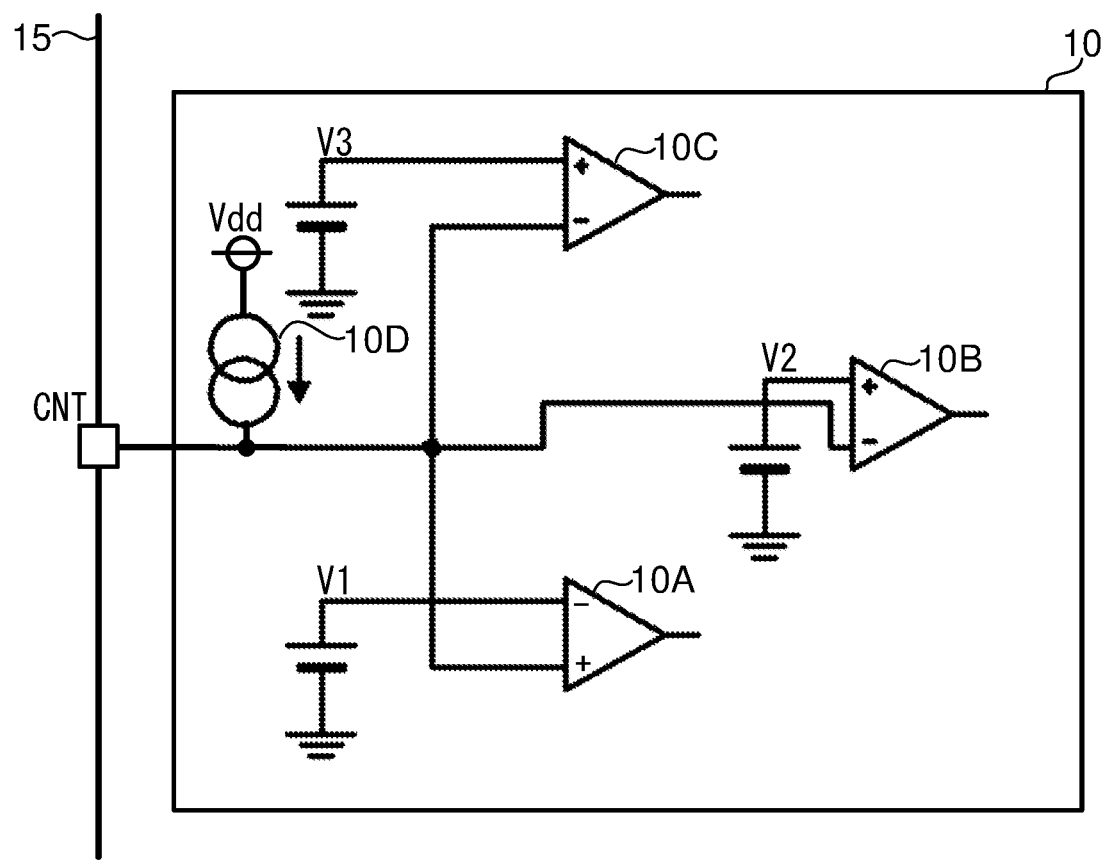
FIG. 17 is a diagram showing a first configuration example of a variable setter.

FIG. 17 is a diagram showing a configuration example of the variable setter 10 configured to discriminate three states as mentioned above. The variable setter 10 of the configuration shown in FIG. 17 includes comparators 10A, 10B, and 10C and a constant current source 10D.

The non-inverting input terminal (+) of the comparator 10A is connected to the CNT terminal. The inverting input terminal (−) of the comparator 10A is connected to an application terminal for a reference voltage V1. The inverting input terminal (−) of the comparator 10B is connected to the CNT terminal. The non-inverting input terminal (+) of the comparator 10B is connected to an application terminal for a reference voltage V2. The inverting input terminal (−) of the comparator 10C is connected to the CNT terminal. The non-inverting input terminal (+) of the comparator 10C is connected to an application terminal for a reference voltage V3. Between an application terminal for an internal voltage Vdd and the CNT terminal, the constant current source 10D is provided.

Here, the reference voltage V1 has a voltage value slightly higher than 0 V (specifically, e.g., 0.6 V). The reference voltage V2 has a voltage value slightly higher than the internal voltage Vdd (specifically, if Vdd=2.5 V then, e.g., 3.0 V). The reference voltage V3 has a voltage value slightly lower than the supply voltage Vin (specifically, e.g., VIN−1 V).

In that case, if the CNT terminal is at the supply voltage Vin, it can be detected based on the output of the comparator 10C being at low level. If the CNT terminal is open, it can be detected based on the output of the comparator 10B being at low level and in addition the output of the comparator 10C being at high level. If the CNT terminal is at GND, it can be detected based on the output of the comparator 10A being at low level.

Incidentally, a configuration that discriminates two states at the CNT terminal, i.e., whether it is open or is fed with GND, as mentioned above, can be achieved, for example, by omitting from the configuration in FIG. 17 the comparators 10B and 10C or the comparators 10A and 10C.

Figure 18:
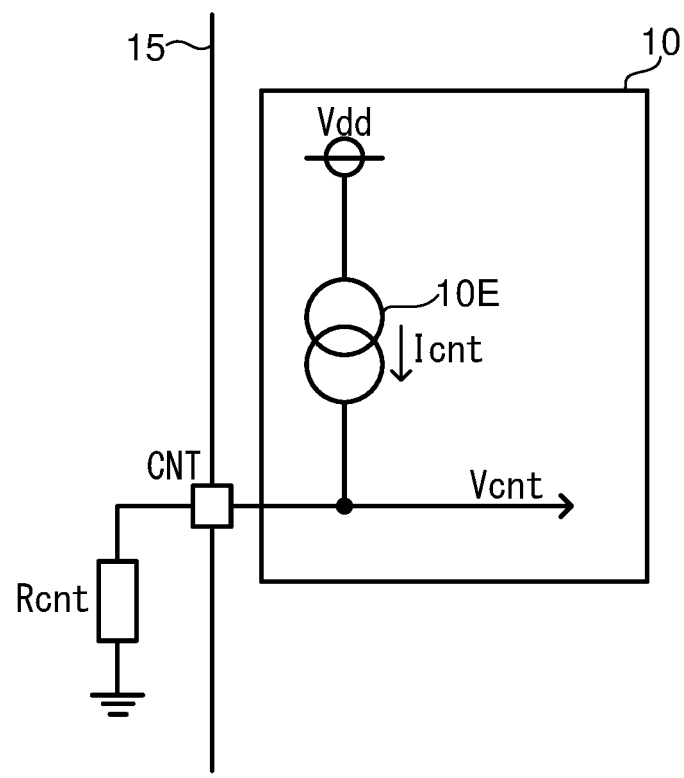
FIG. 18 is a diagram showing a second configuration example of a variable setter.

FIG. 18 is a diagram showing another configuration example of the variable setter 10. The variable setter 10 of the configuration shown in FIG. 18 has a constant current source 10E. The constant current source 10E is provided between the application terminal for the internal voltage Vdd and the CNT terminal. To the CNT terminal, a setting resistor Rcnt is externally connected.

With this configuration, the voltage Vcnt at the CNT terminal equals Icnt×Rcnt (where Icnt is the constant current value of the constant current source 10E). Thus, varying the resistance value of the externally connected setting resistor Rcnt permits the voltage Vcnt to be varied. The variable setter 10 performs variable setting according to the voltage Vcnt. This permits more flexible variable setting.

6. Socket-Type LED Module

Figure 19:
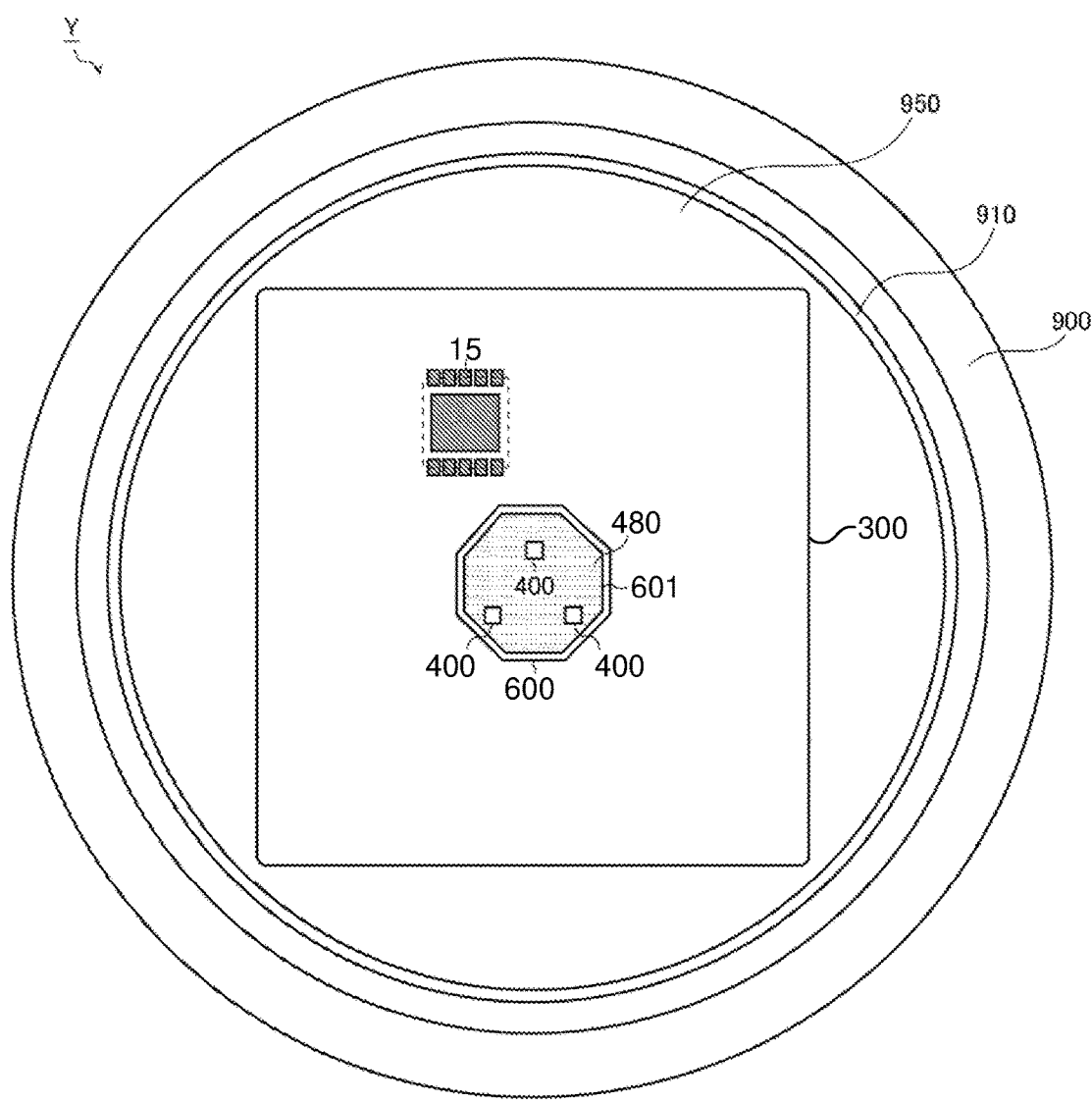
FIG. 19 is a plan view showing a configuration example of a socket-type LED module.

FIG. 19 is a plan view of a socket-type LED module Y as one example of implementing the LED lighting device X1 described above. The socket-type LED module Y of this configuration example is, for example, a lighting appliance for vehicle onboard use, and includes a circuit board 300, LED chips 400, white resin 480, a reflector 600, an LED driving device 15, and a socket 900. While FIG. 19 shows, for the sake of convenience, three LED chips 400 as those constituting the LED light source 200, this is not meant to limit the number of LED chips (the example shown in FIG. 1 has four LED chips). In FIG. 19, for the sake of convenience, the electronic components that are externally connected to the LED driving device 15 are omitted from illustration.

The circuit board 300 has a substrate and wiring patterns (indicated by hatched regions in the diagram) formed on it. The substrate is in a rectangular shape and is formed of, for example, glass epoxy resin. The wiring patterns are electrically conductive members laid on the surface of the substrate to have the LED chips 400 and various electronic components mounted on them, and are formed of, for example, metal such as Cu or Ag. On the top face of the circuit board 300, the LED driving 15 and various externally connected components are mounted. Those electronic components are interconnected by the wiring patterns laid on the top and bottom faces of the circuit board 300 to form circuits, which make the LED chips 400 light in a desired lighting condition.

The reflector 600 is formed of, for example, white resin, and is fixed in a central region on the circuit board 300 so as to surround the LED chips 400. The reflector 600 serves to reflect upward the light shone sideways from the LED chips 400. The reflector 600 has a reflective surface 601 formed on it. The reflective surface 601 surrounds the LED chips 400. Though not visibly shown in FIG. 16, the reflective surface 601 is inclined such that, the farther away from the circuit board 300 in its thickness direction, the farther away from the LED chips 400 in the direction orthogonal to the thickness direction of the circuit board 300. That is, the reflective surface 601 is in a tapered shape such that its cross-sectional area orthogonal to the thickness direction of the circuit board 300 increases toward the open end of the reflector 600.

The white resin 480 is formed of a white resin material that does not transmit the light from the LED chips 400, and is one example of opaque resin. As will be understood from FIG. 19, the white resin 480 surrounds the LED chips 400 and at its outer circumferential edge reaches the reflective surface 601 of the reflector 600. Thus, in FIG. 19, the region extending from the LED chips 400 to the reflective surface 601 upward, downward, leftward, and rightward in the diagram is filled with the white resin 480.

The socket 900 is a part that, with the circuit board 300 mounted on it, is fitted to, for example, an automobile. The socket 900 is formed of, for example, synthetic resin by, for example, injection molding. The socket 900 has a mount 910, on which the circuit board 300 is mounted, and a base, at which the socket 900 is fitted to an automobile or the like. The mount 910 is in a cylindrical shape open at one end, and the circuit board 300 is mounted on the inner bottom face of the mount 910. To the inner bottom face of the mount 910 is fixed a heat sink plate 950, which is, for example, a circular plate made of aluminum. The circuit board 300 is mounted on the mount 910 of the socket 900 with the bottom face of the circuit board 300 bonded with adhesive to the top face of the heat sink plate 950.

The white resin 480 covers all over the annular region extending from the support substrates of the LED chips 400 to the reflective surface 601 of the reflector 600. Thus, the region surrounded by the reflective surface 601 is covered by the white resin 480 except the regions occupied by the LED chips 400. Thus, more of the light from the semiconductor layer of the LED chips 400 can be reflected. This helps enhance the brightness of the socket-type LED module Y. Moreover, the region of the circuit board 300 surrounded by the reflective surface 601 does not need to be treated specially to reflect light satisfactorily.

The reflector 600 with the reflective surface 601 allows brighter lighting right above the socket-type LED module Y.

In particular, vehicle-mounted lights are required by law to remain lit in the event of a drop in the supply voltage Vin. In view of this, it can be said that the LED driving device 15 with the bypass function is very suitable as a principal agent that drives vehicle-mounted lights.

Figure 20:
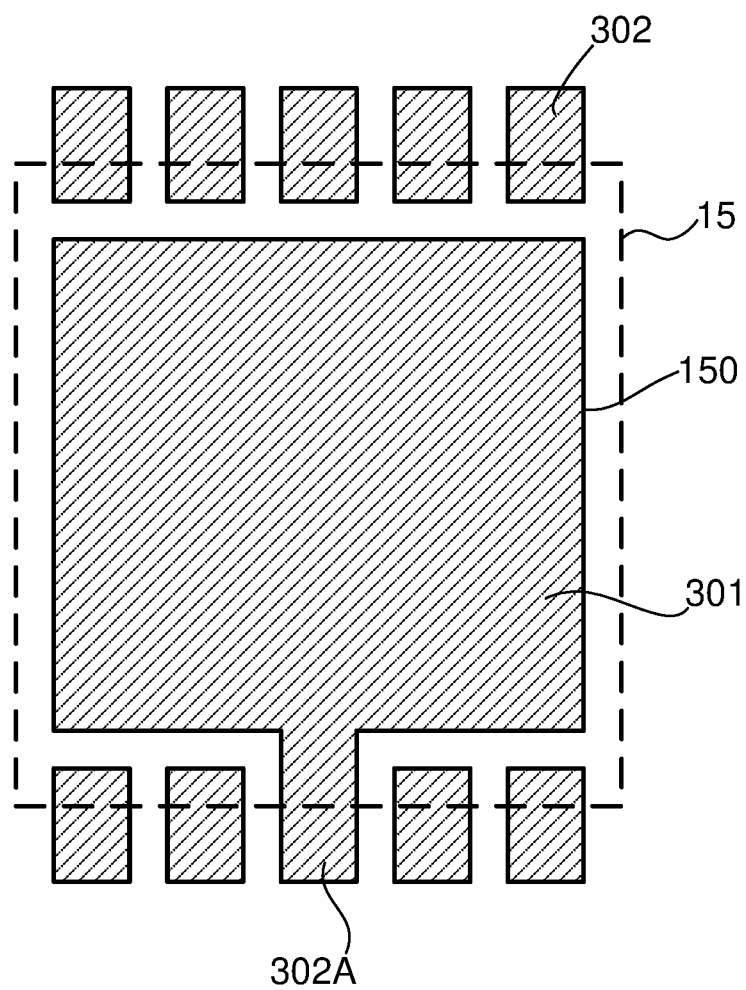
FIG. 20 is an enlarged view of an example of wiring patterns on a circuit board.

FIG. 20 is an enlarged view of an example of the wiring patterns on the circuit board 300. The wiring patterns shown in FIG. 20 include a ground wiring 301 that forms what is called a planar ground pattern and a plurality of terminal wirings 302 that are arranged around the ground wiring 301.

With the LED driving device 15 mounted on the circuit board 300, a heat sink pad 150 formed on the bottom face of the LED driving device 15 is electrically connected to the ground wiring 301. The external terminals of the LED driving device 15 are electrically connected to the terminal wirings respectively. The terminal wiring 302A shown in FIG. 20 is electrically connected to the CNT terminal of the LED driving device 15. The terminal wiring 302A is integral with the ground wiring 301 and this permits the CNT terminal to be fed with GND.

Figure 21:
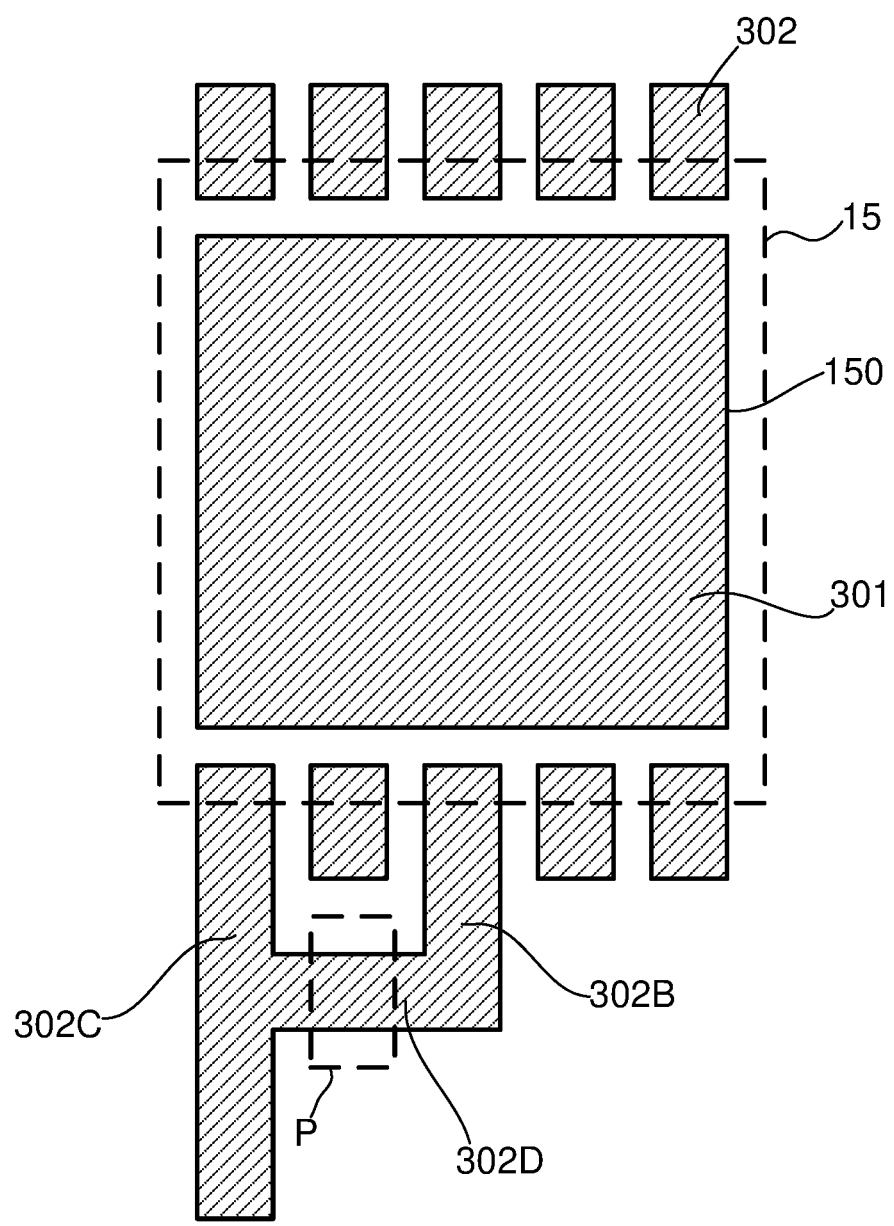
FIG. 21 is an enlarged view of another example of wiring patterns on a circuit board.

On the other hand, FIG. 21 is an enlarged view of another example of the wiring patterns on the circuit board 300. The wiring patterns shown in FIG. 21 include a terminal wiring 302B and a terminal wiring 302C. The terminal wiring 302C is not adjacent to the terminal wiring 302B. The terminal wiring 302B is electrically connected to the CNT terminal of the LED driving device 15. The terminal wiring 302C is electrically connected to the VIN terminal of the LED driving device 15.

As shown in FIG. 21, the CNT terminal is fed with the supply voltage Vin as a result of the terminal wiring 302B being connected with the terminal wiring 302C by a connection wiring 302D. The connection wiring 302D extends laterally, in the direction in which the terminal wirings 302 (the external terminals of the LED driving device 15) are arrayed. With the socket-type LED module Y, however, because of the small size of the circuit board 300, a component P (such as a resistor) may be arranged at the place where the connection wiring 302D has to be provided, preventing it from being provided there. This may prevent the supply voltage Vin from being fed to the CNT terminal.

By contrast, as shown in FIG. 20, despite the small size of the circuit board 300, the terminal wiring 302A for GND can easily be made integral with the ground wiring 301. Thus, to the socket-type LED module Y is particularly suitably applicable an LED driving device 15 provided with a variable setter 10 configured to discriminate two states at the CNT terminal, i.e., whether it is open or is fed with GND, as described above.

Incidentally, with a variable setter 10 configured to discriminate three states at the CNT terminal, i.e., whether it is fed with the supply voltage Vin, is open, or is fed with GND, it may be difficult to apply the supply voltage Vin to the CNT terminal as explained above. This can be coped with, for example, by leaving the CNT terminal, according to the number of LED chips constituting the low-potential-side LED 202 (the number of LED chips connected in series), fed with GND if the number is the most frequently used one (e.g., one), open if the number is the second most frequently used one (e.g., two), and fed with the supply voltage Vin if the number is the least frequently used one (e.g., three).

7. Application

Figure 22:
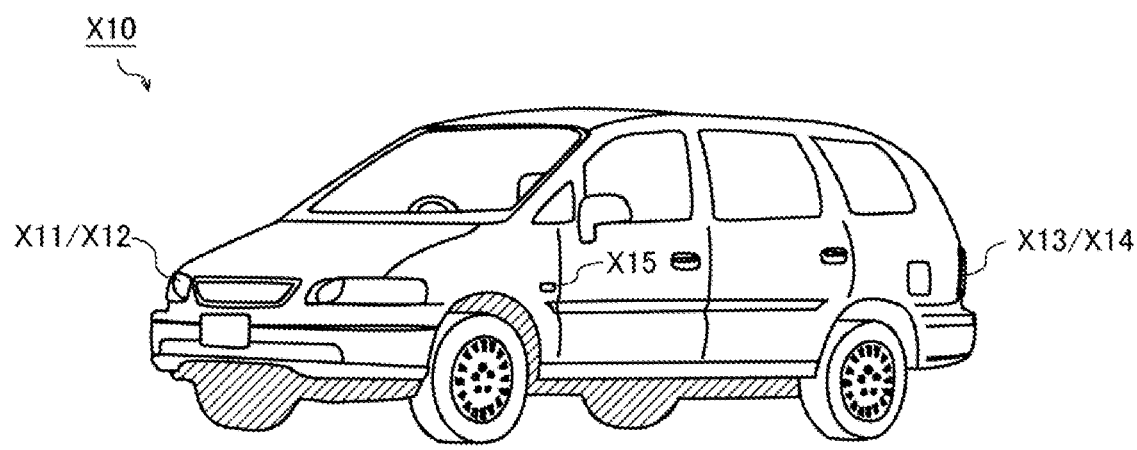
FIG. 22 is an exterior view (from the front) of an example of a vehicle incorporating an LED driving device.
Figure 23:
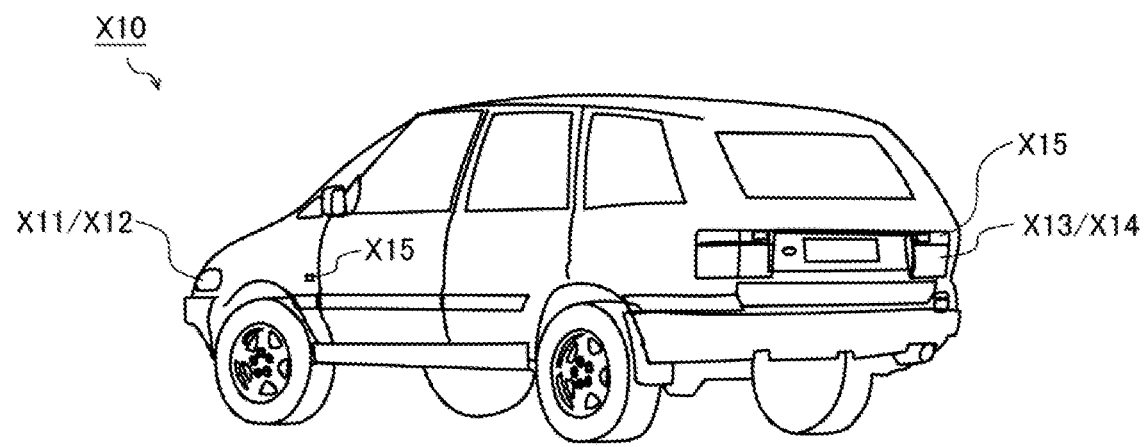
FIG. 23 is an exterior view (from the rear) of an example of a vehicle incorporating an LED driving device.

The LED driving device 15 described above can be used, for example as shown in FIGS. 22 and 23, in a form incorporated in a lighting device on a vehicle X10, such as a headlight (including a high-beam light, a low-beam light, a parking light, a fog light, or the like) X11, a daylight running lamp (DRL) X12, a tail light (including a parking light, a back light, or the like) X13, a stop light X14, a turning light X15, or the like.

The LED driving device 15 may be provided in a form of a module together with an LED light source 200 as the target of driving (like the socket-type LED module Y described above), or may be provided as an IC proper separate from an LED light source 200.

8. Modifications

While an illustrative embodiment has been described above, it allows for any modifications within the scope of the technical ideas of the present invention.

For example, while the embodiment described above deals with, as an example, a configuration that use LEDs as light-emitting elements, this is not meant to limit how the present invention is to be implemented. For example, it is possible to use, instead, organic electro-luminescence elements.

For another example, while the embodiment described above deals with, as an example, a configuration where the current driver 1 is of a current-source type (i.e., the type of output achieved by passing the output current Iout from a power terminal to the anode of the LED light source 200), this is not meant to limit the configuration of the LED driving device 15. The use of the bypass function described above is effective also in a configuration where the current driver 1 is be of a current-sink type (i.e., the type of output achieved by drawing the output current Iout from the cathode of the LED light source 200 to a ground terminal).

9. Notes

As described above, for example, according to one aspect of the present disclosure, a light-emitting element driving device (15) includes:
  a current driver (1) configured to generate an output current (Iout) that passes through a light-emitting element light source (200) connected between an application terminal for a supply voltage (Vin) and a ground terminal;
  a first external terminal (ISINK terminal) connectable to a node (Nx) at which a high-potential-side light source (201) and a low-potential-side light source (202) included in the light-emitting element light source are connected together in series with each other;
  a bypass controller (4) configured to draw, according to the supply voltage, the output current from the first external terminal to control the conducting state of a path for bypassing the low-potential-side light source;
  a constant current source (7) and a switch (8) provided between the application terminal for the supply voltage and the first external terminal;
  a comparator (6) configured to compare the voltage at the first external terminal and an open detection threshold voltage (Vth_op) to output a detection signal;
  a UVLO circuit (2) configured to compare the supply voltage with a UVLO (undervoltage lock-out) threshold voltage (Vin_UVLO) to output a UVLO detection signal (Suvlo); and
  a variable setter (10) configured to variably set the open detection threshold voltage and the UVLO threshold voltage in a manner coordinated therebetween.

When the supply voltage starts up, the bypass controller keeps the path off, and if the UVLO detection signal indicates that UVLO is inactive, the bypass controller turns the switch on and, if the detection signal indicates that the voltage at the first external terminal is higher than the open detection threshold voltage, the bypass controller judges that an open fault is present on the low-potential side of the node and keeps the path off. (A twelfth configuration.)

In the twelfth configuration described above, the variable setter variably may set, in a manner coordinated with the open detection threshold voltage and the UVLO threshold voltage, a wait time (Twait) for which the bypass controller stays on standby after turning the switch on until judging that an open fault is present. (A thirteenth configuration.)

In the thirteenth configuration described above, the wait time may be set with consideration given to the capacitance of a capacitive element (Csink) that is externally connectable to the first external terminal to cope with an EMC test. (A fourteenth configuration.)

In any of the twelfth to fourteenth configurations described above, when the UVLO detection signal indicates that UVLO is inactive and in addition a light-emitting element on signal (Sled_on) indicates that the light-emitting element light source is to be on, the bypass controller may turn the switch on. (A fifteenth configuration.)

The fifteenth configuration described above may further include: a CR timer (9) to which a capacitor (Ccrt) and a resistor (Rcrt) is externally connectable and that is configured to generate, as the capacitor is charged and is discharged via the resistor, a triangular wave and a PWM dimming signal (Spwm) which is a pulse signal according to the triangular wave.

The current driver may be turned on and off based on the PWM dimming signal.

The light-emitting element on signal may be a signal based on the PWM dimming signal.

In a DC dimming mode, the CR timer may be capable of generating the PWM dimming signal with a fixed level. (A sixteenth configuration.)

Any of the twelfth to sixteenth configurations described above may further include a second external terminal (CNT terminal). The variable setter may perform the variable setting according to a signal fed to the second external terminal. (A seventeenth configuration.)

In the seventeenth configuration described above, the variable setter may discriminate two states at the second external terminal by detecting whether the second external terminal is open or is fed with GND (a ground potential). The variable setter may perform the variable setting according to the result of the discrimination. (An eighteenth configuration.)

In the seventeenth configuration described above, the variable setter may discriminate three states at the second external terminal by detecting whether the second external terminal is fed with the supply voltage, is open, or is fed with GND (a ground potential). The variable setter may perform the variable setting according to the result of the discrimination. (A nineteenth configuration.)

In the seventeenth configuration described above, the variable setter may include a constant current source (10E). The variable setter may perform the variable setting based on the voltage appearing at the second external terminal when the constant current (Icnt) produced by the constant current source is passed via a setting resistor (Rcnt) externally connectable to the second external terminal. (A twentieth configuration.)

According to another aspect of the present disclosure, a lighting device (X1) includes: the light-emitting element driving device (15) of any of the first to ninth configurations described above; and the light-emitting element light source (200). (A twenty-first configuration.)

In the twenty-first configuration described above, the light-emitting element light source may be an LED light source. (A twenty-second configuration.)

The twenty-first or twenty-second configuration described above may further include: a circuit board (300) having formed on it wiring patterns on which to mount the light-emitting element light source and the light-emitting element driving device; and a socket (900) on which to mount the circuit board. (A twenty-third configuration.)

In the twenty-third configuration described above, the light-emitting element driving device may include: a second external terminal (CNT terminal); and a heat sink pad (150) provided on the bottom face.

The wiring patterns may include: a terminal wiring (302A) electrically connected to the second external terminal; and a ground wiring (301) integral with the terminal wiring and electrically connected to the heat sink pad.

The variable setter may discriminate two states at the second external terminal by detecting whether the second external terminal is open or is fed with GND (a ground potential), the variable setter performing the variable setting according to a result of the detection. (A twenty-fourth configuration.)

According to another aspect of the present disclosure, a vehicle (X10) includes the lighting device (X1) of any of the twenty-first to twenty-fourth configurations described above.

INDUSTRIAL APPLICABILITY

The present disclosure finds applications in, for example, light-emitting element driving devices for vehicle onboard use.

REFERENCE SIGNS LIST 1 current driver
2 current setter
2A output transistor
2B error amplifier
3 current adder
3A output transistor
3B error amplifier
4 constant current source
5 LED driving device
10 LED light source
300 circuit board
400 LED chip
480 white resin
600 reflector
601 reflective surface
900 socket
910 mount
950 heat sink plate
B battery
Rset, Rset_th setting resistor
TH1,TH2 thermistor
X1 LED lighting device
X10 vehicle
X11 headlight
X12 daylight running lamp
X13 tail light
X14 stop light
X15 turning light
Y socket-type LED module

The invention claimed is:
1. A light-emitting element driving device, comprising:
a current driver configured to generate an output current that passes through a light-emitting element light source connected between an application terminal for a supply voltage and a ground terminal;

a first external terminal connected to a node at which a high-potential-side light source and a low-potential-side light source included in the light-emitting element light source are connected together in series with each other;

a bypass controller configured to draw, according to the supply voltage, the output current from the first external terminal to control a conducting state of a path for bypassing the low-potential-side light source;

a first constant current source and a switch provided between the application terminal for the supply voltage and the first external terminal;

a comparator configured to compare a voltage at the first external terminal and an open detection threshold voltage to output a detection signal;

a UVLO circuit configured to compare the supply voltage with a UVLO threshold voltage to output a UVLO detection signal; and a variable setter configured to coordinate variable setting of the open detection threshold voltage and the UVLO threshold voltage wherein when the supply voltage starts up, the bypass controller keeps the path off, and if the UVLO detection signal indicates that UVLO is inactive, the bypass controller turns the switch on and, if the detection signal indicates that the voltage at the first external terminal is higher than the open detection threshold voltage, the bypass controller judges that an open fault is present on a low-potential side of the node and keeps the path off.

2. The light-emitting element driving device according to claim 1, wherein the variable setter is configured to coordinate variable setting of the open detection threshold voltage and the UVLO threshold voltage, a wait time for which the bypass controller stays on standby after turning the switch on until judging that an open fault is present.

3. The light-emitting element driving device according to claim 2, wherein the wait time is set with consideration given to a capacitance of a capacitive element that is externally connected to the first external terminal to cope with an EMC test.

4. The light-emitting element driving device according to claim 1, wherein when the UVLO detection signal indicates that UVLO is inactive and in addition a light-emitting element on signal indicates that the light-emitting element light source is to be on, the bypass controller turns the switch on.

5. The light-emitting element driving device according to claim 4, further comprising:

a CR timer to which a capacitor and a resistor are externally connected, the CR timer being configured to generate, as the capacitor is charged and is discharged via the resistor, a triangular wave and a PWM dimming signal which is a pulse signal according to the triangular wave, wherein the current driver is turned on and off based on the PWM dimming signal;

the light-emitting element on signal is a signal based on the PWM dimming signal, and in a DC dimming mode, the CR timer can generate the PWM dimming signal with a fixed level.

6. The light-emitting element driving device according to claim 1, further comprising:

a second external terminal, wherein the variable setter performs the variable setting according to a signal fed to the second external terminal.

7. The light-emitting element driving device according to claim 6, wherein the variable setter discriminates two states at the second external terminal by detecting whether the second external terminal is open or is fed with GND (a ground potential), the variable setter performing the variable setting according to a result of the discrimination.

8. The light-emitting element driving device according to claim 6, wherein the variable setter discriminates three states at the second external terminal by detecting whether the second external terminal is fed with the supply voltage, is open, or is fed with GND (a ground potential), the variable setter performing the variable setting according to a result of the discrimination.

9. The light-emitting element driving device according to claim 6, wherein the variable setter includes a second constant current source, the variable setter performing the variable setting based on a voltage appearing at the second external terminal when a constant current produced by the second constant current source is passed via a setting resistor externally connected to the second external terminal.

10. A lighting device, comprising:

the light-emitting element driving device according to claim 1; and the light-emitting element light source.

11. The lighting device according to claim 10, wherein the light-emitting element light source is an LED light source.

12. The lighting device according to claim 10, further comprising:

a circuit board having formed thereon wiring patterns on which to mount the light-emitting element light source and the light-emitting element driving device; and a socket on which to mount the circuit board.

13. The lighting device according to claim 12, wherein the light-emitting element driving device includes:

a second external terminal; and a heat sink pad provided on a bottom face, the wiring patterns include:

a terminal wiring electrically connected to the second external terminal; and a ground wiring integral with the terminal wiring and electrically connected to the heat sink pad, and the variable setter discriminates two states at the second external terminal by detecting whether the second external terminal is open or is fed with GND (a ground potential), the variable setter performing the variable setting according to a result of the discrimination.

14. A vehicle, comprising the lighting device according to claim 10.

* * * * *